United States Patent
Miller et al.

(10) Patent No.: US 7,145,626 B2
(45) Date of Patent: Dec. 5, 2006

(54) PHORETIC DISPLAY DEVICE WITH LIQUID CRYSTALLINE SUSPENSION MEDIUM, AND MANUFACTURING METHOD

(75) Inventors: Richard Jonathan Miller, Malvern (GB); Victor Chaklam Hui, Malvern (GB)

(73) Assignee: Qinetiq Limited (GB)

( * ) Notice: Subject to any disclaimer, the term of this patent is extended or adjusted under 35 U.S.C. 154(b) by 172 days.

(21) Appl. No.: 10/524,095

(22) PCT Filed: Aug. 11, 2003

(86) PCT No.: PCT/GB03/03512
§ 371 (c)(1), (2), (4) Date: Feb. 9, 2005

(87) PCT Pub. No.: WO2004/015491
PCT Pub. Date: Feb. 19, 2004

(65) Prior Publication Data
US 2005/0248696 A1 Nov. 10, 2005

(30) Foreign Application Priority Data
Aug. 13, 2002 (GB) ................. 0218776.3

(51) Int. Cl.
C09K 19/52 (2006.01)
(52) U.S. Cl. ............................... 349/166
(58) Field of Classification Search ......... 349/163–166
See application file for complete search history.

(56) References Cited

U.S. PATENT DOCUMENTS

| 2,800,457 | A | 7/1957 | Green et al. |
| 3,041,288 | A | 6/1962 | Anthony |
| 3,668,106 | A | 6/1972 | Ota |
| 4,305,807 | A | 12/1981 | Somlyody |
| 5,729,320 | A * | 3/1998 | Eidenschink et al. ........ 349/166 |

(Continued)

FOREIGN PATENT DOCUMENTS

EP    1154312    11/2001

(Continued)

OTHER PUBLICATIONS

Terent'ev "Moment Theory of Elasticity and Interation of Disclinaitons in Liquid Crystals", Kristallografiya, pp. 288-296 (1987).

Primary Examiner—James Dudek
(74) Attorney, Agent, or Firm—McDonnell Boehnen Hulbert & Berghoff LLP

(57) ABSTRACT

A phoretic display device comprising a plurality of electrophoretic or magnetophoretic cells, each having a phoretic particle dispersed within a suspension medium comprising a liquid crystal material. The phoretic cell is adapted to induce defects, sometimes known as disclinations, in the alignment of the liquid crystal material within the cell which act to exert a retentive force on the phoretic particle when within the region of influence of the defects. The configuration of the display introduces a threshold level in the electric or magnetic field required to move the phoretic particle between defects within the cell. Accordingly, the non-linear electro-optic or magneto-optic behaviour of the display facilitates matrix addressing of the cells therein. The display may comprise a plurality of prolate spheroid phoretic cells arranged in an encapsulant, the major (long) axis of each cell arranged substantially perpendicular to the plane of the display.

26 Claims, 10 Drawing Sheets

U.S. PATENT DOCUMENTS

| | | | |
|---|---|---|---|
| 6,650,384 B1 * | 11/2003 | Oguchi et al. | 349/86 |
| 6,798,470 B1 * | 9/2004 | Iwanaga et al. | 349/86 |
| 7,086,599 B1 * | 8/2006 | Murakami et al. | 235/487 |
| 2002/0135860 A1 * | 9/2002 | Iwanaga et al. | 359/296 |
| 2002/0191142 A1 * | 12/2002 | Oguchi et al. | 349/165 |
| 2004/0058612 A1 * | 3/2004 | Hiji et al. | 445/24 |

FOREIGN PATENT DOCUMENTS

WO      WO 98/41899      9/1998

* cited by examiner

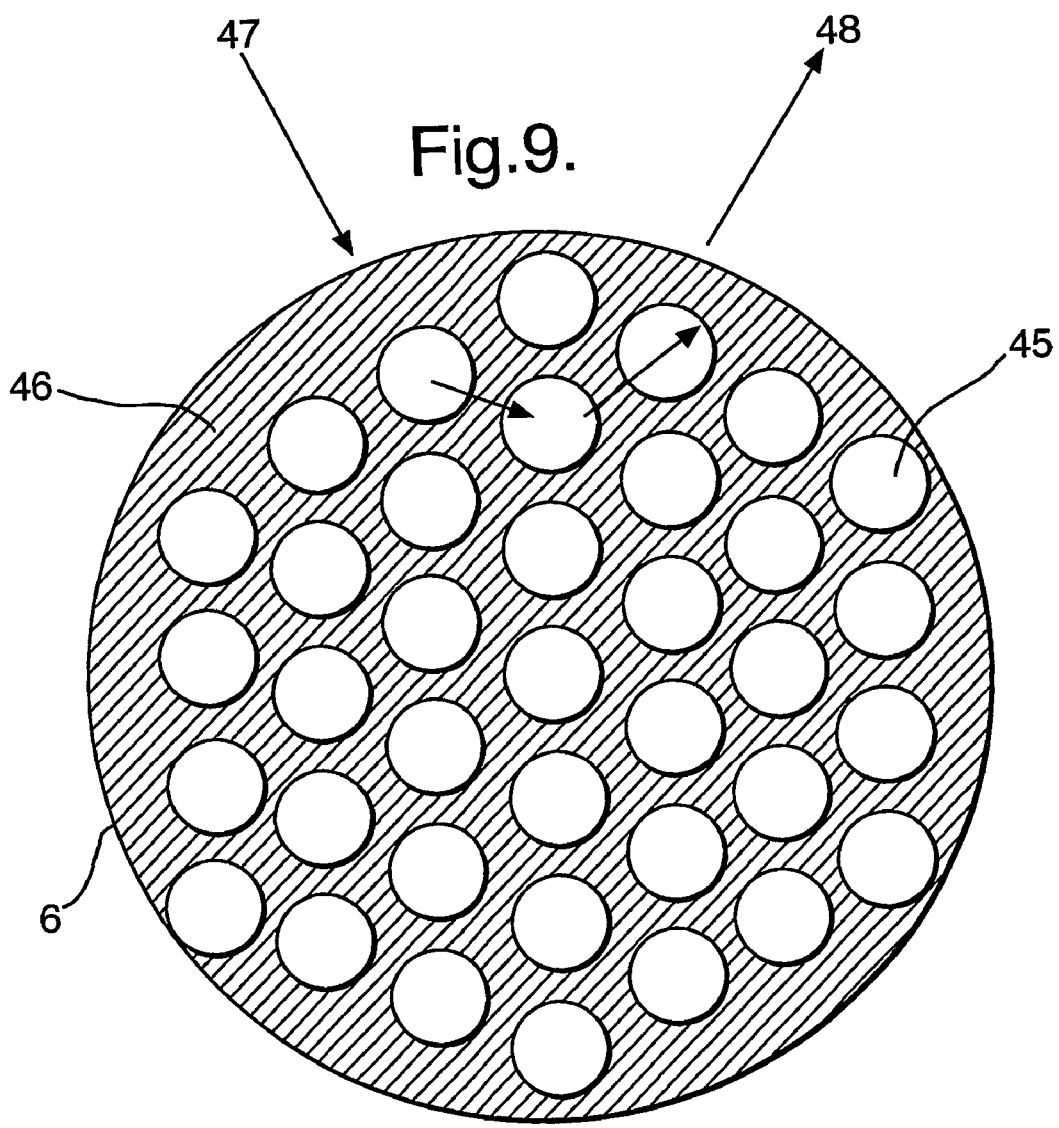

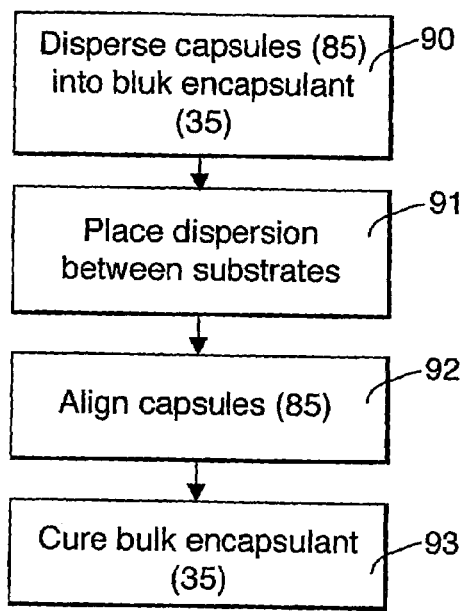
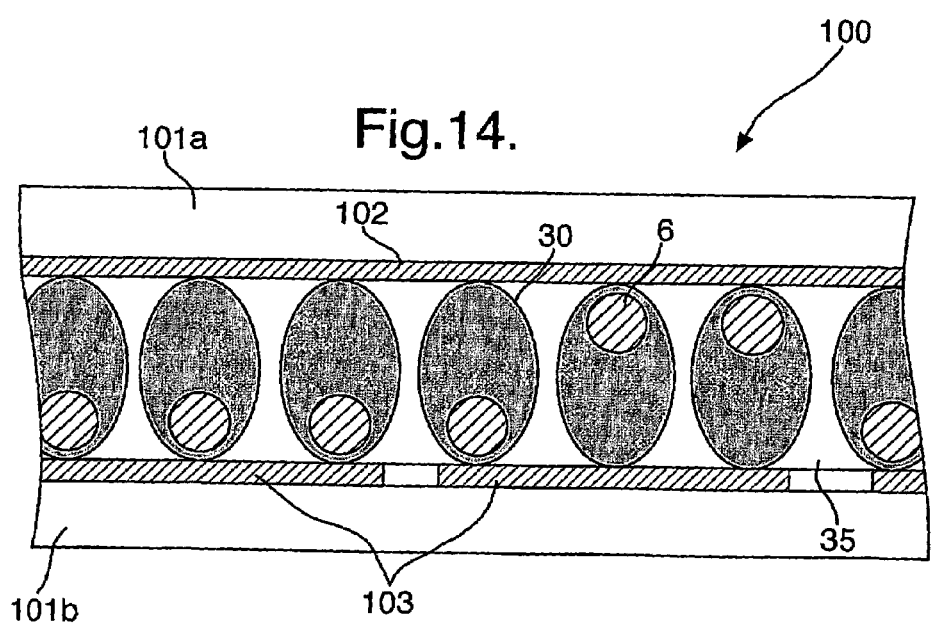

PHORETIC DISPLAY DEVICE WITH LIQUID CRYSTALLINE SUSPENSION MEDIUM, AND MANUFACTURING METHOD

The present invention relates to phoretic display devices, and in particular to electrophoretic and magnetophoretic display devices which exhibit non-linear electro-optic and magneto-optic behaviour respectively. The present invention also relates to a method of fabricating an electrophoretic display having non-linear electro-optic behaviour.

Phoretic displays typically comprise a suspension layer containing finely divided phoretic particles dispersed within a liquid suspension medium. The spatial distribution of the phoretic particles within the suspension layer may be altered by applying a magnetic or electric field to the device. The particles migrate within the device under the influence of the applied field.

Conventional electrophoretic displays comprise a suspension layer containing finely divided electrophoretic particles dispersed within a liquid suspension medium. Such electrophoretic displays operate on the principle that the spatial distribution of the electrophoretic particles within the suspension layer may be altered via an electric potential applied to the device. The electric potential is usually applied to the suspension layer using electrodes deposited on or near the front and rear surfaces respectively of the display. Using this configuration the electrophoretic particles may be encouraged to migrate between the front and rear surfaces of the display in response to the applied electric potential. An accumulation of the electrophoretic particles near the front or rear display surface alters the optical reflective properties of the suspension layer in that region and in this manner an image may be formed on the display.

A generic advantage of such electrophoretic displays is the ability to produce high contrast images without the use of polarising filters in the construction of the display.

The structure and principle of operation of such an electrophoretic display is described in detail in U.S. Pat. No. 3,668,106. The electrophoretic display panel comprises a cell formed by two opposed transparent insulating substrates which have transparent electrodes formed thereon respectively, and an electrophoretic suspension, which consists of fine particles of coloured electrophoretic material suspended in a coloured suspension medium, in said cell. When a D.C. voltage is applied to the cell, the particles are moved and deposited on one electrode according to the polarity of the electrophoretic material. The image formed by the accumulation of the electrophoretic material is observed by reflective light.

The display described in U.S. Pat. No. 3,668,106 exhibits some temporary stability in that the deposited electrophoretic material will stay on the electrode even after removal of the applied electric field. However the long term permanence of such a display is doubtful since the electrophoretic material merely adheres to the electrodes due to Van der Waals attraction and electrostatic forces.

A major limitation associated with conventional electrophoretic displays of the type described in U.S. Pat. No. 3,668,106 is that the Van der Waals forces can cause the particles of electrophoretic material within the suspension to adhere to one another, thereby compromising the stability of the suspension. In the long term, this can lead to failure of the display due to precipitation of the particles from the suspension.

If the display device is made such that there is no Van der Waals adhesion, then the electro-optical characteristics of the display preclude matrix multiplexing of cells within the display. Matrix multiplexing typically involves a plurality of electrodes arranged respectively in rows and columns on opposing internal surfaces within a display. The cells in a matrix multiplexed display are arranged at the positions where the row and column electrodes overlap and each cell is addressed by applying an electric potential via the appropriate row and column electrodes.

The above mentioned limitation is caused by a characteristic of the conventional electrophoretic cell whereby the change of optical state depends on the product of time and voltage. That is, nearly any small voltage across a cell will cause it to eventually change its optical state. The magnitude of the applied voltage merely affects the time it takes for the optical change of state to occur. Furthermore, the effect of repeated application of a small electric potential is cumulative and with sufficient cumulative volt-seconds applied a given picture element (pixel) in the display will change its optical state. This prevents passive matrix multiplexing.

One fundamental requirement of a display cell when utilised in a passive matrix addressing fashion is to exhibit a definite threshold, that is a highly non-linear electro-optic behaviour. When a voltage below the threshold value is applied to the cell repeatedly, the optical state of the cell must not change. However, when a voltage above the threshold value (for example twice the threshold value) is applied, the cell is required to quickly change its optical state. If this condition is not met, then the display will show severe crosstalk. That is, elements that are not required to produce a picture will begin to turn on and elements that are a requisite part of the picture may begin to turn off.

Despite the above mentioned limitation of the electrophoretic cell, several methods have been developed for incorporating a threshold effect in the cell.

Firstly, Van der Waals forces may inherently introduce a threshold effect in the cell. However, the foregoing paragraphs have already indicated that Van der Waals forces compromise the lifetime of the device. Accordingly, Van der Waals forces do not offer a practical solution for incorporating a threshold effect in the electrophoretic cell.

By way of another example, it is possible to connect in series with the electrophoretic cell another device that exhibits a non-linear electrical characteristic, thereby providing non-linear electro-optic behaviour. Typically, such non-linear devices may include diodes, zener diodes and varistors.

Unfortunately, the use of non-linear devices within the display increases the complexity and hence cost of the overall display. The reliability of the display may also be reduced due to the additional components.

Alternatively, an active matrix of thin-film transistors may be employed to switch individual cells within a matrix display. In the case of thin-film transistors used for active matrix addressing of displays, the physical size of the transistors imposes a limitation on the arrangement of the pixels in the display and restricts the resolution of the display.

An electrophoretic display which inherently exhibits non-linear electro-optic behaviour is therefore preferred.

An invention aimed at solving this problem is described in U.S. Pat. No. 4,305,807.

The display described in U.S. Pat. No. 4,305,807 utilises a liquid crystal material as the suspension medium within the electrophoretic cell. The cell is configured such that the orientation of the liquid crystal molecules within the cell may be altered in response to an applied electric potential. The applied electric potential must however exceed a critical threshold level for the liquid crystal molecules to change their orientation. Hence, the definite threshold potential required to re-orientate the liquid crystal molecules within the cell enables X-Y matrix selection of cells within the display.

The display operates on the principle that the viscosity of the liquid crystal suspension medium, as experienced by the electrophoretic particles, varies as a function of the orientation of the liquid crystal molecules within the cell due to its anistropic properties.

Accordingly, the apparent viscosity of the suspension medium may be spatially modulated in sympathy with the re-orientation of the liquid crystal molecules upon the application of an electric potential to the display.

When the apparent viscosity of the suspension medium is high, movement of electrophoretic particles in that region of the display is impeded by the orientation of the liquid crystal molecules. The mobility of the particles within the suspension medium is therefore reduced. Conversely, when the apparent viscosity of the suspension medium is low, movement of electrophoretic particles in that region of the display is not impeded by the orientation of the liquid crystal molecules. In the latter case the mobility of the particles is increased and the particles may move within the suspension medium under the influence of the applied electric potential.

The anisotropic viscosity of the liquid crystal suspension medium provides a mechanism to control the movement of the electrophoretic particles within the display.

Whilst U.S. Pat. No. 4,305,807 enables X-Y matrix selection of cells within the electrophoretic display, the performance of the display may be limited by the configuration adopted. For example, the apparent viscosity of the liquid crystal suspension medium in the display merely hinders the migration of the electrophoretic particles in the display in the response to the applied electric field, it does not preclude the movement of the electrophoretic particles. Hence, the display may still exhibit a degree of crosstalk.

EP 1,154,312 describes an optical switching device having a similar configuration to that used in U.S. Pat. No. 4,305,807. The optical switching device described in EP 1,154,312 comprises an insoluble light-control medium dispersed within a liquid crystalline material. In common with U.S. Pat. No. 4,305,807, application of an electric field to the device causes the orientation of the liquid crystal molecules in the liquid crystalline material to change, thereby enabling movement of the light-control medium within the device. This causes a change in the distribution density of the light-control medium in the liquid crystalline material layer.

In contrast to U.S. Pat. No. 4,305,807, the principle cause of movement of the light-control medium is flow of the liquid crystalline material induced by the electric field applied to the device. Typically such flow is caused by the injection of ions into the liquid crystal, which is known to lead to long term degradation of the liquid crystal material.

It is an object of the present invention to ameliorate at least some of the disadvantages of the above displays and to provide an improved electrophoretic display. It is another object of the invention to provide an electrophoretic display which exhibits non-linear electro-optic behaviour and which may be addressed using X-Y matrix selection of cells within the device. It is a further object of the present invention to provide a method of fabricating an electrophoretic display having non-linear electro-optic behaviour.

According to a first aspect of the present invention, a phoretic cell comprises a liquid crystal cell having a liquid crystal material and a phoretic particle therein, the phoretic particle being moveable from a first preferred position at a first side of the liquid crystal cell to a second side of the liquid crystal cell on application of a field, the liquid crystal cell being adapted such that, when the phoretic particle is not located at the first preferred position, there is a defect associated with the first preferred position and the liquid crystal defect energy of the defect is lower when the phoretic particle is located substantially at the first preferred position within the liquid crystal cell than when the phoretic particle is not so located.

In a preferred embodiment, the applied field must exceed a threshold level to move the phoretic particle from the first preferred position to the second side of the liquid crystal cell.

A defect, sometimes called a disclination, may be thought of as a discontinuity in the orientation of the liquid crystal molecules as described by the liquid crystal director. In the region immediately surrounding the defect the liquid crystal alignment is highly distorted from its lowest energy state, where the director is parallel everywhere. Hence, there is a large amount of elastic energy associated with the defect. For the purposes of this patent specification this elastic energy will be known as the defect energy.

Defects can take different forms depending on the type of distortion of the liquid crystal surrounding them. Typically defects are categorised by how much and in what direction the orientation of the liquid crystal director rotates around a path enclosing the defect. In this way positive and negative sign defects can be defined where the director rotates in opposite senses and the degree of rotation governs the magnitude. This value is known as the defect strength and can be positive or negative. Two defects of opposite sign will attract each other and by moving their centres will mutually reduce their elastic energy. This attraction can continue to the point at which the defect centres combine to leave a defect with a strength equal to the sum of the strengths of the original two defects; negative and positive strengths then cancel. In the case where two defects are equal and opposite in strength then the defects effectively annihilate each other leaving no residual defect.

The defects within the liquid crystal material are configured to attract the phoretic particles dispersed therein; each defect giving rise to an associated region of influence within the liquid crystal material. Once within a particular region of influence, a phoretic particle is attracted towards the defect associated with that region of influence. If unobstructed, the phoretic particle will move within the region of influence to adopt a preferred position where the elastic energy due to the defect is minimised.

The term "associated" has been used in the foregoing to describe the relationship between the defect, the region of influence exerted by the defect within the cell, and the preferred position within the cell arising due to said defect (e.g. the first preferred position). This nomenclature has been used to convey the fact that, in some circumstances it may be impossible for the particle to reach the position of the defect centre since the particle may be hindered by the cell wall. There will still, however, be a position of the particle that minimizes the elastic energy of the system.

In some cases, but not exclusively, the above hindrance by the cell wall may be due to the defect being "virtual". A virtual defect is where the defect centre is actually outside the region of the liquid crystal but it still exerts influence on the behaviour of the liquid crystal. This influence is brought about by the alignment of the liquid crystal at the surface into which the virtual defect is hidden. Typically, a virtual defect may occur in cases where the surface anchoring energy is weak or the surface has a non-zero pretilt.

In the interests of clarity, where there is a reference to a defect in this patent specification, said defect may be a virtual defect hidden in a surface or a conventional defect within the liquid crystal material.

Hereinafter, each defect in the system shall be similarly described as associated with the preferred position within the cell arising due to said defect.

In the present invention, the presence of the phoretic particle distorts the alignment of the liquid crystal material in the vicinity thereof and hence the phoretic particle acts as a mobile defect or collection of defects within the system.

In the case of the present liquid crystal cell, the defect associated with the first preferred position and the defect associated with the phoretic particle are arranged to have opposite signs. Hence, the defects attract each other and by movement of the phoretic particle will mutually reduce their elastic energy.

When the phoretic particle is in the bulk of the liquid crystal material it is relatively free to move under the influence of the applied field. However, when the particle is within the region of influence of another defect in the liquid crystal material, an interaction occurs between the defects, thereby reducing the liquid crystal defect energy associated with said defects.

The liquid crystal defect energy of the defect associated with the first preferred position is therefore minimised when the defect associated with the phoretic particle and the defect associated with the first preferred position are superposed. Where the geometry of the system allows, the defects interact to such an extent that they may be said to effectively annihilate. In this situation the term "defect" shall refer to the core where the defect associated with the first preferred position originally arose.

Therefore, the first preferred position may be that where the defect or collection of defects associated therewith is superposed with the defect associated with the phoretic particle. However, the geometry of the liquid crystal cell and the geometry of the phoretic particle may not allow such superposition. In this case, the position of the phoretic particle in which the liquid crystal defect energy is minimised (which is the first preferred position) will be located in the vicinity of the defect and will be dictated by the cell geometry.

The present invention provides the advantage that when the defect associated with the phoretic particle interacts with the defect associated with the first preferred position, the phoretic particle will tend to be attracted to and adhere to the first preferred position. Furthermore, the applied field must exceed a threshold level for sufficient time in order to move the phoretic particle from the first preferred position to the second side of the liquid crystal cell. This provides a non-linear characteristic for moving the phoretic particle from the first preferred position within the liquid crystal cell to the second side of the liquid crystal cell.

Preferably the phoretic particle is moveable reversibly from a second preferred position at the second side of the liquid crystal cell to the first preferred position at the first side of the liquid crystal cell on application of a field, the liquid crystal cell being adapted such that, when the phoretic particle is not located at the second preferred position, there is a defect associated with the second preferred position and the liquid crystal defect energy of the defect is lower when the phoretic particle is located substantially at the second preferred position within the liquid crystal cell than when the phoretic particle is not so located.

In a preferred embodiment, the applied field must exceed a threshold level to move the phoretic particle from the second preferred position to the first preferred position within the liquid crystal cell.

In a similar manner to that discussed above, the liquid crystal defect energy associated with the second preferred position may therefore be minimised when the defect associated with the phoretic particle and the defect associated with the second preferred position are superposed. Where the geometry of the system allows, the defects interact to such an extent that they may be said to effectively annihilate. In this situation the term "defect" shall refer to the core where the defect associated with the second preferred position originally arose.

By reversing the polarity of the applied field, the phoretic particle is transferable from the first preferred position to the second preferred position and vice versa.

This embodiment of the present invention provides the advantage that when the defect associated with the phoretic particle interacts with the defect associated with the second preferred position, the phoretic particle will tend to be attracted to and adhere to the second preferred position. Accordingly, in this embodiment of the present invention the phoretic particle is moveable between two stable positions, namely at the first and second preferred positions respectively within the liquid crystal cell.

Furthermore, the applied field must exceed a threshold level for sufficient time in order to move the phoretic particle from the second preferred position to the first preferred position within the liquid crystal cell. This provides a non-linear characteristic for moving the phoretic particle from the second preferred position within the liquid crystal cell to the first preferred position within the liquid crystal cell. This configuration also provides the advantage that the phoretic particle is moveable reversibly between the first and second preferred positions within the liquid crystal cell by reversing the polarity of the applied field.

Advantageously the magnitude of the threshold level associated with moving the phoretic particle from the first preferred position to the second preferred position within the liquid crystal cell is different to that for moving the phoretic particle from the second preferred position to the first preferred position within the liquid crystal cell.

The above mentioned difference in the magnitude of the threshold levels results in asymmetric switching thresholds depending on the polarity of the field applied across the liquid crystal cell. Where there is a requirement to control a plurality of such phoretic cells, for example in a multi-cellular display, such asymmetry facilitates multiplexed matrix addressing and allows a technique known as line ahead blanking to be used to address the cells.

In a preferred embodiment, the phoretic cell has a plurality of first preferred positions at the first side of the liquid crystal cell, each first preferred position having a defect associated therewith, and a plurality of phoretic particles dispersed within the liquid crystal material. The phoretic cell may have a plurality of second preferred positions at the second side of the liquid crystal cell, each second preferred position having a defect associated therewith. At least one internal surface of the liquid crystal cell may be profiled so as to induce said defects.

When configured as described above, each phoretic particle within the phoretic cell is moveable between the first and second preferred positions associated therewith and in this manner the cell may be spatially modulated. The above phoretic cell may therefore be used as a multi-cellular phoretic display.

This embodiment of the present invention is beneficial in that the defects are induced in a controllable manner by profiling at least one internal surface of the liquid crystal cell. A surface alignment treatment may also be applied to the at least one internal surface of the liquid crystal cell in order to provide a preferred orientation of the liquid crystal material. For example, a surface alignment treatment giving essentially non homeotropic anchoring conditions may be used. A suitable surface treatment is one in which a tangential component of the liquid crystal director is encouraged, providing a tilted or planar alignment. A surface alignment treatment may also be applied to the phoretic particles within the liquid crystal cell. Again, a surface alignment treatment giving essentially non homeotropic anchoring conditions may be used on the phoretic particles.

Advantageously, the profile comprises a plurality of indentations arranged in an array.

Conveniently, the indentations are arranged in a regular array.

Conveniently, the array comprises a two-dimensional array and the indentations are arranged in a close-packed configuration therein. The indentations may be arranged in a hexagonal close-packed configuration within the array. In the interests of clarity, use of the terms close-packed and hexagonal close-packed herein to describe the arrangement of the indentations within the array is analogous to their conventional use in describing crystal lattice structures.

Preferably, the indentations comprise substantially semi-ellipsoidal indentations.

Even more preferably, the indentations comprise substantially semi-spheroidal indentations.

Advantageously, the indentations comprise substantially semi-spherical indentations.

Even more advantageously, the indentations comprise substantially hemispherical indentations.

The prefix "semi" as used in the context of this specification shall be taken to define a part or portion of a geometric shape to which it is applied, without limitation to that portion being a half; for example a semi-spheroid shall define a portion of a spheroid (said portion not being limited to a half). Where the portion of a geometric shape comprises substantially a half of said shape, then the prefix "hemi" has been used herein in preference to the more generic prefix "semi"; for example the term "hemisphere" shall define substantially half of a sphere.

Preferably, the indentations are arranged at a pitch, p, within the array and each indentation has a depth, d. In the interests of clarity, the term pitch used hereinafter shall refer to the distance between successive indentations within a regular array.

Even more preferably the ratio of the depth of the indentations, d, to the pitch of the indentations, p, is at least a quarter.

In a preferred embodiment, the pitch of the indentations, p, is in the range 2–50 μm.

Preferably the pitch of the indentations, p, is in the range 3–30 μm.

Even more preferably the pitch of the indentations, p, is in the range 4–15 μm.

In a preferred embodiment, the diameter of the phoretic particle is in the range 0.5 to 0.9 times that of the pitch of the indentations, p.

Preferably, the diameter of the phoretic particle is in the range 0.7 to 0.8 times that of the pitch of the indentations, p.

Where the phoretic cell contains a single phoretic particle, the liquid crystal cell may comprise a liquid crystal droplet.

Advantageously, the phoretic cell comprises a plurality of liquid crystal cells, each liquid crystal cell comprising a liquid crystal droplet.

The arrangement of the liquid crystal cell in the form of a liquid crystal droplet or a plurality of liquid crystal droplets facilitates production of said liquid crystal cells.

The liquid crystal droplets may be substantially spherical, each liquid crystal droplet having a length, L, equal to the droplet diameter D.

Conveniently, the liquid crystal droplets are substantially prolate spheroids, each liquid crystal droplet having a length, L, measured along the major axis and a diameter, D, measured along the minor axis of the liquid crystal droplet, and the first and second preferred positions are arranged substantially in opposition along the major axis of each liquid crystal droplet.

In a preferred embodiment, the length, L, of the liquid crystal droplet is in the range 1–30 μm.

Preferably the length, L, of the liquid crystal droplet is in the range 5–20 μm.

Even more preferably the length, L, of the liquid crystal droplet is in the range 10–15 μm.

In a preferred embodiment, the diameter of the phoretic particle is in the range 0.2 to 0.8 times that of the liquid crystal droplet.

Preferably, the diameter of the phoretic particle is in the range 0.3 to 0.7 times that of the liquid crystal droplet.

Even more preferably, the diameter of the phoretic particle is in the range 0.4 to 0.6 times that of the liquid crystal droplet.

Advantageously, the or each liquid crystal cell includes a dye. Conveniently, the or each liquid crystal cell includes an oil soluble dye. The dye may comprise at least one of a dichroic dye, an azo dye, an anthraquinone dye, a pharmaceutical dye, a cosmetic dye, a food dye, 1-hydroxy-4-[(4-methylphenyl)amino]-9,10-anthracenedione, 2-(2-quinolyl)-1,3-indandione, 1,4-bis[(4-methylphenyl)amino]-9,10-anthracenedione, 1-[[4-(phenylazo)phenyl]azol]-2 naphthalenol, solvent black 3, solvent black 5, solvent black 7, solvent black 12, solvent black 28, solvent blue 4, solvent blue 14, solvent blue 19, solvent blue 29, solvent blue 35, solvent blue 36, solvent blue 37, solvent blue 38, solvent blue 43, solvent blue 59, solvent blue 78, solvent blue 97, solvent blue 104, solvent brown 1, solvent brown 53, solvent green 1, solvent green 3, solvent green 4, solvent green 5, solvent green 7, solvent green 11, solvent green 28, solvent orange 1, solvent orange 2, solvent orange 7, solvent orange 15, solvent orange 20, solvent orange 23, solvent orange 60, solvent orange 63, solvent orange 105, solvent red 3, solvent red 19, solvent red 23, solvent red 24, solvent red 26, solvent red 27, solvent red 41, solvent red 43, solvent red 44, solvent red 45, solvent red 49, solvent red 72, solvent red 111, solvent red 135, solvent red 140, solvent red 179, solvent red 195, solvent red 207, solvent violet 8, solvent violet 13, solvent violet 37, solvent violet 59, solvent yellow 1, solvent yellow 2, solvent yellow 3, solvent yellow 7, solvent yellow 14, solvent yellow 33, solvent yellow 72, solvent yellow 93, solvent yellow 94, solvent yellow 98, solvent yellow 114, solvent yellow 141, solvent yellow 160, and solvent yellow 163.

In a preferred embodiment, the or each phoretic particle is adapted to reflect electromagnetic radiation incident thereon.

Advantageously, the or each phoretic particle has a reflective coating comprising at least one of a metallic coating and a dielectric coating.

In another preferred embodiment the or each phoretic particle comprises a composite particle having a plurality of scattering particles adapted to scatter electromagnetic radiation incident thereon dispersed within a carrier. The carrier may comprise, a polymer, for example polymethyimethacrylate (PMMA). The scattering particles may comprise titanium dioxide ($TiO_2$). Alternatively, or in addition, the scattering particles may comprise polymer spheres, each polymer sphere incorporating at least one of a gas cavity and crushed diamond.

The composite phoretic particle maximises scattering of light thereby providing good reflectance. This is a particularly desirable property when the phoretic cell is used in a display device.

The applied field may be at least one of an electric field and a magnetic field.

According to a second aspect of the present invention, a method for fabricating a phoretic cell having a plurality of first preferred-positions at the first side of the liquid crystal cell and a plurality of phoretic particles suspended within a liquid crystal suspension medium, comprises the steps of (i) preparing a first substrate having a first relief structure alignment layer adapted to interact with the liquid crystal suspension medium to provide a preferred alignment of the liquid crystal director within the phoretic cell, (ii) forming a plurality of indentations within the relief structure alignment layer, each indentation having an internal surface extending from a relief structure surface of the relief structure alignment layer, (iii) depositing the phoretic particles onto the first relief structure surface, (iv) incorporating the liquid crystal suspension medium into the cell.

Advantageously, where the phoretic cell has a second preferred position at the second side of the cell, the method further comprises the steps of (v) preparing a second substrate having a second relief structure alignment layer adapted to interact with the liquid crystal suspension medium to provide a preferred alignment of the liquid crystal director within the phoretic cell, (vi) forming a plurality of indentations within the second relief structure alignment layer, each indentation having an internal surface extending from a relief structure surface of the second relief structure alignment layer, (vii) arranging the second substrate remotely to the first substrate such that the relief structure alignment layer thereof interacts with the liquid crystal suspension medium to provide a preferred alignment of the liquid crystal director within the phoretic display.

Preferably, the method comprises the step of arranging each indentation in the relief structure surface of the first relief structure alignment layer substantially opposite a corresponding indentation in the relief structure surface of the second relief structure alignment layer, said indentations forming an opposing pair of indentations.

Even more preferably, the method comprises the step of arranging a phoretic particle within each opposing pair of indentations.

Conveniently, at least one of the first and second substrates comprises at least one of a polymer and a pre-polymer and the step of forming the plurality of indentations within the relief structure surface comprises an embossing process.

Alternatively, at least one of the first and second substrates comprises a photo-polymer and the step of forming the plurality of indentations within the relief structure surface comprises a photo-lithographic process.

According to a third aspect of the present invention, there is now proposed a display having a first display surface for displaying an image, comprising a phoretic cell according to the first aspect of the present invention, wherein the phoretic cell is arranged within the display such that the or each first preferred position within the liquid crystal cell is located substantially at the first display surface, the display being operable by the application of a field across the display.

This arrangement of the phoretic cell within the display provides the advantage that the or each phoretic particle reflects light incident on the first display surface when located at the or each first preferred position within the liquid crystal cell.

The phoretic cell contained within the display operates in the same manner as in the first aspect of the present invention. In use, the field applied to the display must exceed a threshold level for sufficient time in order to move the phoretic particle from the first preferred position to the second side of the liquid crystal cell or to the second preferred position within the liquid crystal cell.

In the case of a phoretic cell having first and second preferred positions, it is sufficient to merely move the phoretic particle from the region of influence associated with the first preferred position to the region of influence associated with the second preferred position in order to affect the transfer of the particle between the preferred positions. As described previously, this is due to the fact that once within a particular region of influence, a phoretic particle is attracted towards the defect giving rise to that region of influence. If unobstructed, the phoretic particle will move within the region of influence to adopt a preferred position where the elastic energy due to the defect is minimised.

This provides a non-linear characteristic for moving the phoretic particle from the first preferred position within the liquid crystal cell to the second side of the liquid crystal cell/second preferred position within the liquid crystal cell.

In a preferred embodiment, the display has a second display surface disposed remotely to the first display surface, and comprises at least one phoretic cell having a second preferred position at the second side of the liquid crystal cell, wherein the phoretic cell is arranged within the display such that the or each second preferred position within the liquid crystal cell is located substantially at the second display surface, and the first and second preferred positions are such that the or each phoretic particle is visible at a display surface when located at one preferred position and is not visible at said display surface when located at the other preferred position.

This configuration of the phoretic cell within the display provides the advantage that the or each phoretic particle reflects light incident on a particular display surface when located at one preferred position but does not reflect light incident on that particular display surface when located at the other preferred position. Accordingly, the phoretic particle or particles may be made visible at a given display surface or alternatively the particle or particles may be arranged so that the or each particle is not visible at said display surface.

As above, the phoretic cell contained within the display operates in the same manner as in the first aspect of the present invention. In use, the field applied to the display must exceed a threshold level in order to move the phoretic particle from the second preferred position to the first preferred position within the liquid crystal cell. This provides a non-linear characteristic for moving the phoretic particle from the second preferred position within the liquid crystal cell to the first preferred position within the liquid crystal cell.

In another preferred embodiment, the display comprises a phoretic cell having a plurality of liquid crystal cells, each liquid crystal cell comprising a liquid crystal droplet, wherein the liquid crystal droplets are disposed within an encapsulant.

In this embodiment of the present invention, the display may comprise a micro-encapsulated display. For example, the display may comprise a polymer dispersed liquid crystal display.

The encapsulant may comprise at least one of a thermally curable polymer, a polymer curable by electromagnetic radiation and a silicone elastomer. For example, the encapsulant may comprise Dow Corning® Sylgard® 182.

Advantageously, the display comprises a phoretic cell having a plurality of liquid crystal droplets, wherein the liquid crystal droplets are substantially prolate spheroids and are arranged such that the major axis of the droplets is substantially orthogonal to a plane parallel with the first display surface.

Preferably the display further comprising means for applying at least one of an electric field and a magnetic field across the display. For example, the means for applying the field may comprise an electrode.

Preferably, the display comprises a plurality of electrodes arranged in rows adjacent the first display surface and in columns adjacent the second display surface, the intersection of each row and column electrode defining a pixel within the display, so as to enable matrix addressing of the pixels within the display.

The or each electrode may comprise at least one of a metal, Indium Tin Oxide (ITO), and a conductive polymer.

According to a fourth aspect of the present invention a method of fabricating a display according to the second aspect of the present invention comprises the steps of
(i) dispersing a plurality of liquid crystal cells, each liquid crystal cell comprising a liquid crystal droplet as described above, into a curable encapsulant,
(ii) aligning the liquid crystal cells into a preferred alignment,
(iii) curing the encapsulant to retain the liquid crystal cells therein.

Advantageously, the method further comprises the step of applying the dispersion of liquid crystal cells and curable encapsulant onto a substrate.

Preferably, the step of aligning the liquid crystal cells into a preferred alignment is performed after the encapsulant has been cured and comprises the step of expanding the cured encapsulant in a direction substantially perpendicular to the substrate, thereby elongating the liquid crystal cells dispersed therein in a direction substantially perpendicular to the substrate. The step of expanding the cured encapsulant may comprise introducing a material into the cured encapsulant so as to cause the cured encapsulant to swell. The expansion of the encapsulant forces each of the liquid crystal cells to adopt a substantially prolate spheroid configuration. Additionally, the major axis of the cells is arranged to be substantially orthogonal to a plane parallel with the substrate.

Alternatively, the method comprises the intermediate steps of reversibly deforming the substrate in the plane of the substrate prior to curing the encapsulant and subsequently returning the substrate to its undeformed state after curing the encapsulant, so as to perform the step of aligning the liquid crystal cells, such that the cured encapsulant and the liquid crystal cells dispersed therein are compressed in a plane parallel with that of the substrate.

Compressing the liquid crystal cells in a plane parallel with that of the substrate causes each of the cells to adopt a substantially prolate spheroid configuration. Additionally, the major axis of the cells is arranged to be substantially orthogonal to a plane parallel with the substrate.

Conveniently, the step of reversibly deforming the substrate comprises at least one of heating and stretching the substrate.

The invention will now be described, by example only, with reference to the accompanying drawings in which;

FIG. 1 shows a schematic cross sectional representation of conventional electrophoretic display common in the prior art, FIG. 2 shows a schematic representation of a conventional electrophoretic display for displaying alpha-numeric characters, FIG. 3 shows a schematic representation of a surface relief suitable for an electrophoretic display according to the present invention. The means for applying the electric potential to the display have been omitted from the figure for clarity.

FIG. 6 shows a graph of the elastic energy within a bistable or multistable electrophoretic cell according to the present invention as a function of distance between two opposing defects. In this example, the electrophoretic cell comprises two opposing defects and a single phoretic particle arranged there-between.

Figure 7:
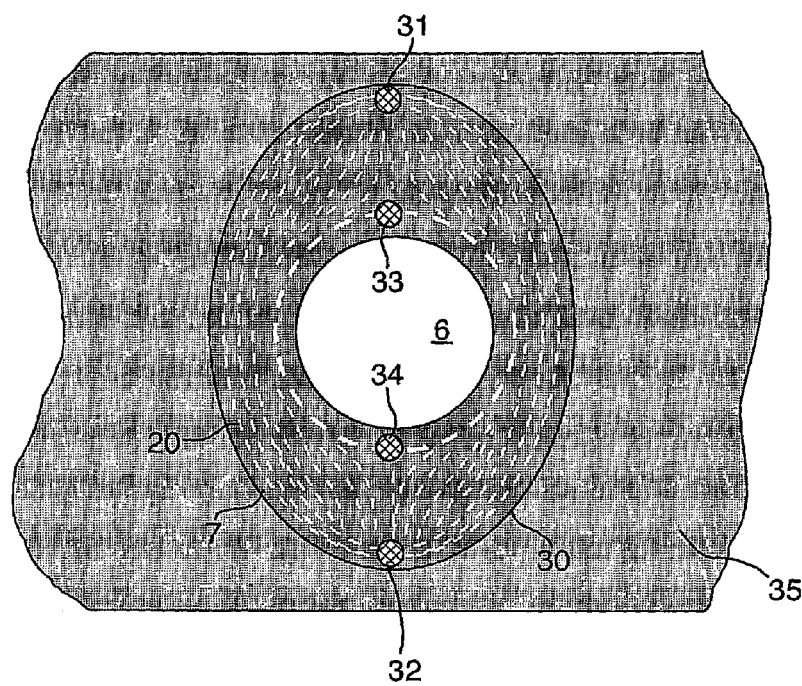

FIG. 7 shows a cross sectional schematic representation of a micro-encapsulated electrophoretic display according to the present invention. A single micro-encapsulated droplet within the display is shown for clarity. The liquid crystal director alignment in the micro-encapsulated droplet and on particle of electrophoretic material is illustrated.

Figure 8:
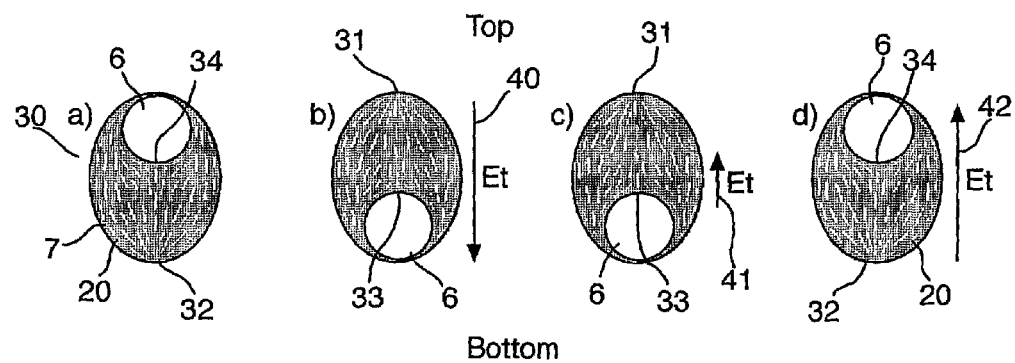

FIG. 8 shows a cross sectional schematic representation of a micro-encapsulated electrophoretic display during operation. A single micro-encapsulated droplet within the display is shown in each of FIGS. 8a–8d for clarity.

FIG. 9 shows a cross sectional schematic representation of a composite electrophoretic particle.

Figure 10A:
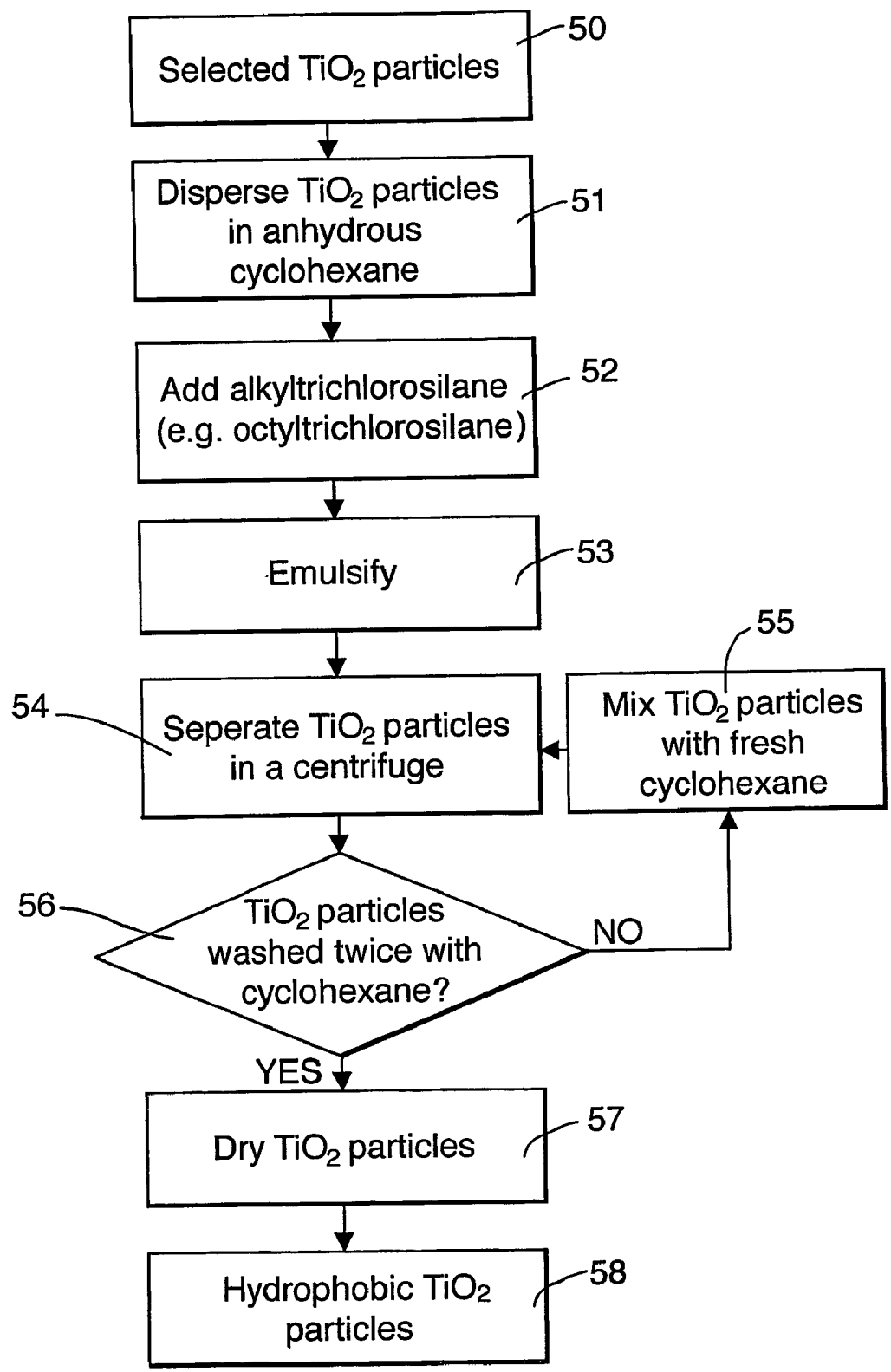
Figure 10B:
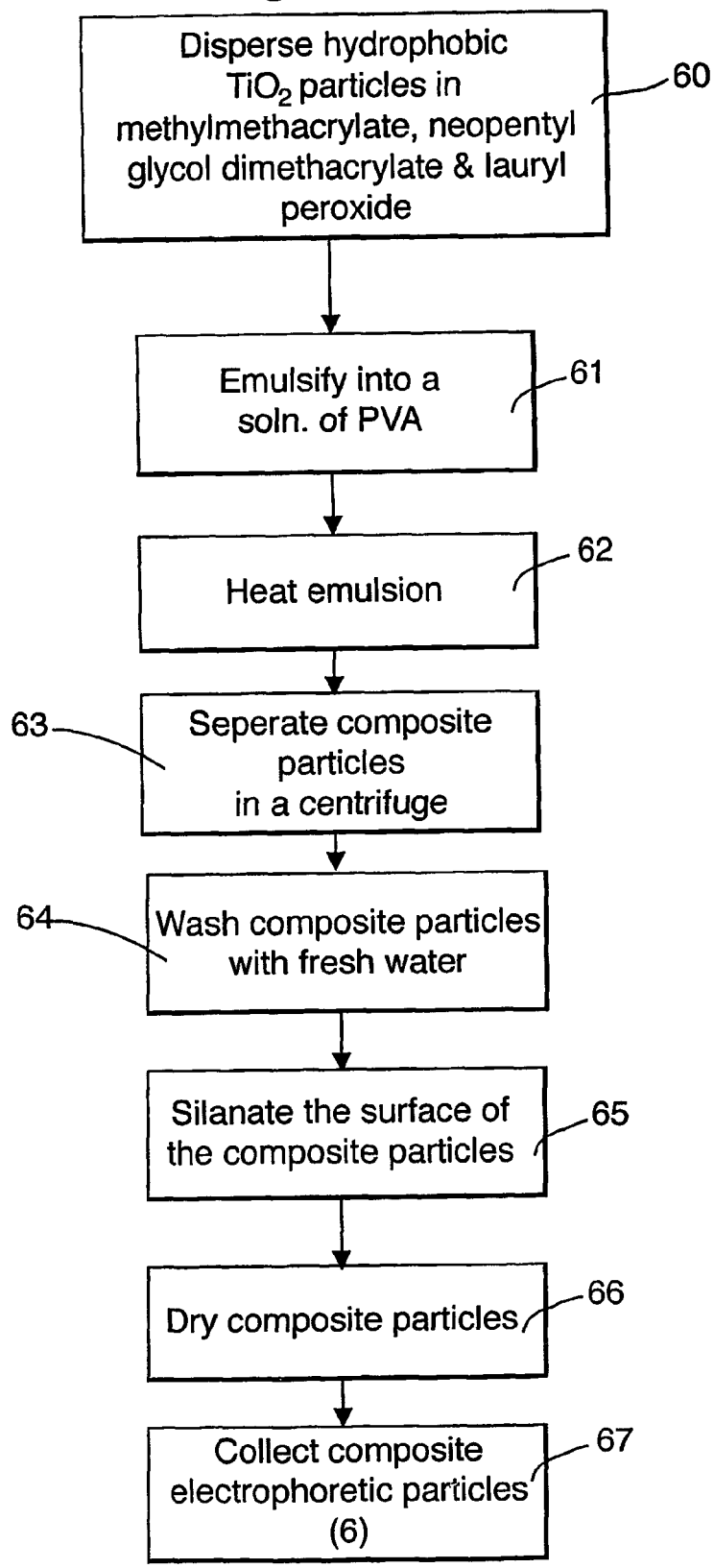

FIG. 10 show a process for preparing particles of electrophoretic material for incorporation into a micro-encapsulated electrophoretic display. FIG. 10a is a flowchart illustrating a process for imparting hydrophobic properties to the particles of electrophoretic material. FIG. 10b is a flowchart illustrating a process for fabricating a composite electrophoretic particle incorporating the hydrophic particles produced by the process of FIG. 10a.

Figure 11:
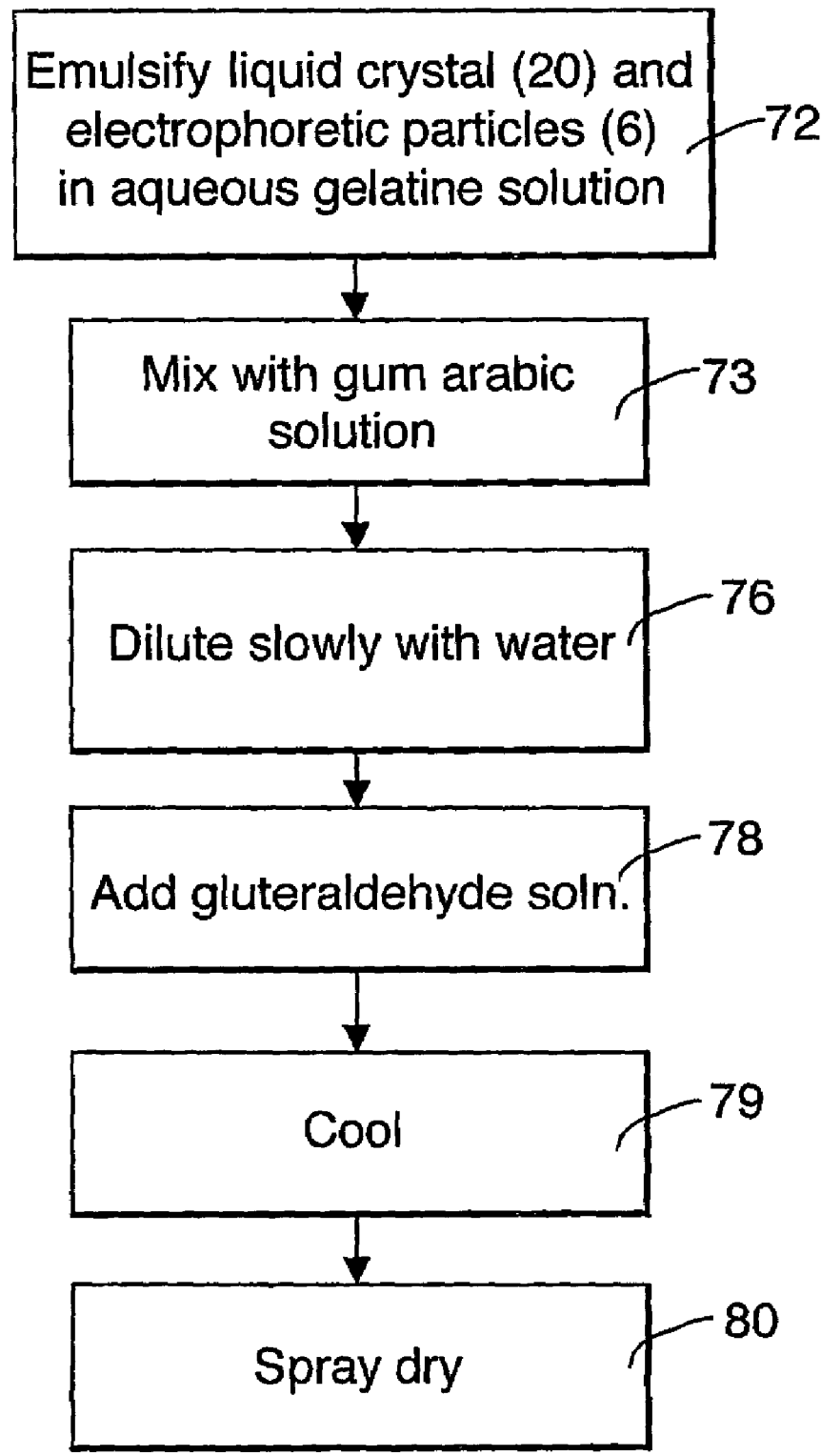

FIG. 11 shows a flowchart illustrating a process for preparing capsules containing liquid crystal (having an electrophoretic particle dispersed therein) for use in a micro-encapsulated electrophoretic display.

Figure 12:
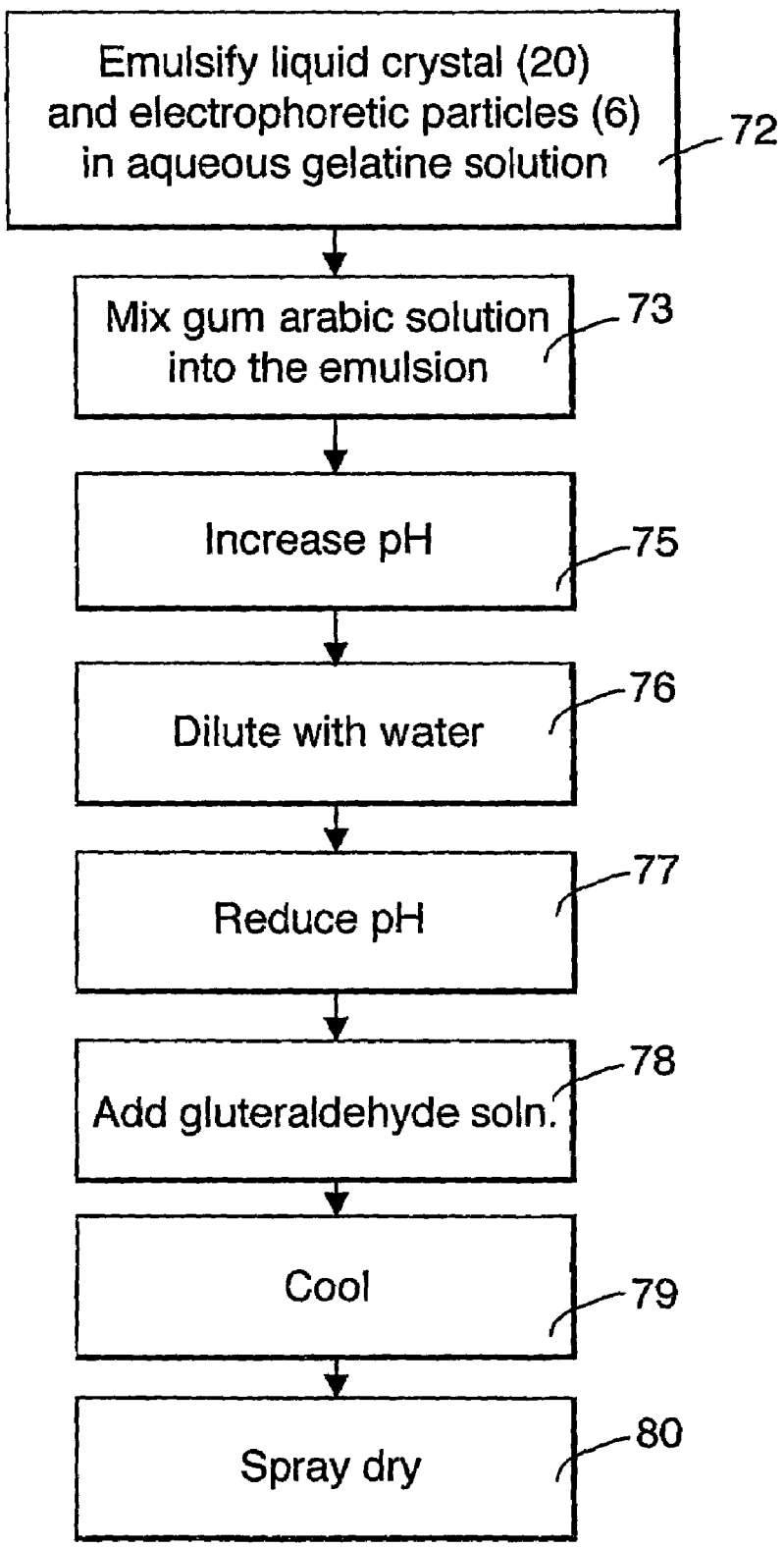

FIG. 12 shows a flowchart illustrating an alternative process for preparing capsules containing liquid crystal (having an electrophoretic particle dispersed therein) for use in a micro-encapsulated electrophoretic display.

FIG. 13 shows a flowchart illustrating a process for fabricating a micro-encapsulated electrophoretic display incorporating the capsules produced by the process of FIG. 12.

FIG. 14 shows a cross sectional schematic representation of a portion of a micro-encapsulated electrophoretic display according to the present invention.

Figure 1:
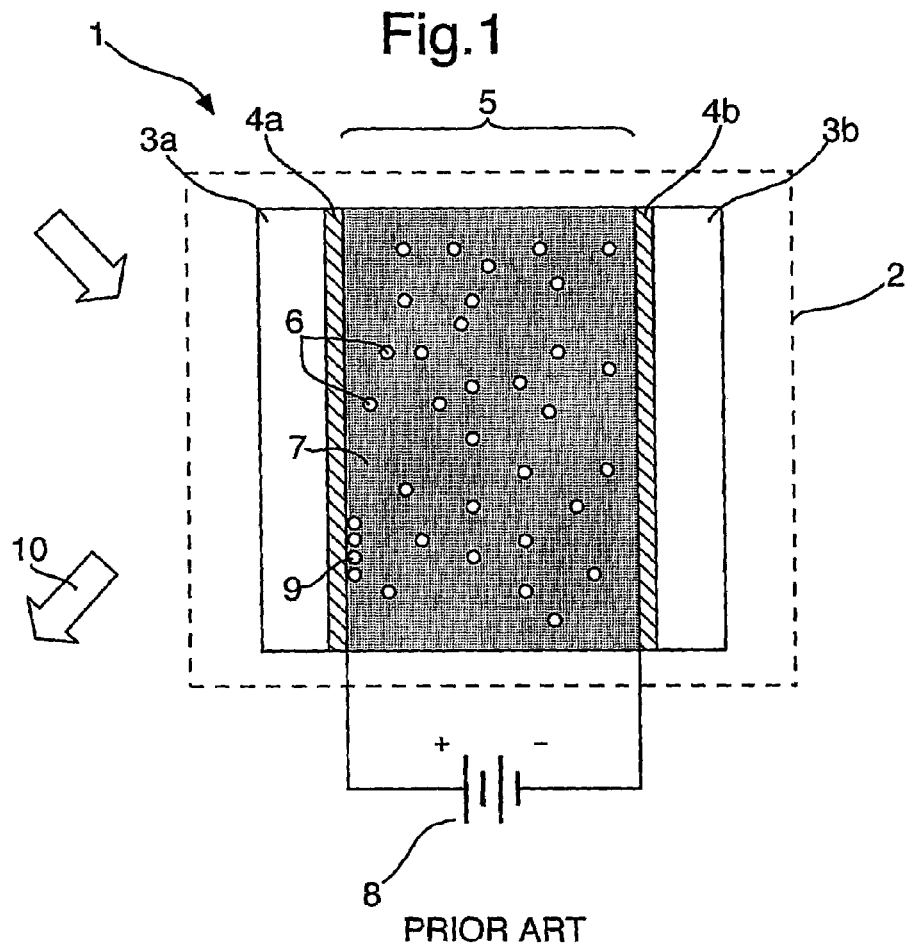

Referring to FIG. 1, a conventional electrophoretic display (1) comprises a cell (2) formed by two opposed transparent insulating substrates (3a,3b) which have transparent electrodes (4a,4b) formed respectively thereon, and an electrophoretic suspension layer (5), which consists of fine particles of electrophoretic material (6) suspended in a suspension medium (7), in the cell. Typically, the particles of electrophoretic material (6) are arranged to be a contrasting colour to that of the suspension medium (7). When an electric potential (8) is applied to the cell (2), the electrophoretic particles (6) are moved and deposited on one electrode (4a,4b) according to the polarity of the electrophoretic material (6), and the thus formed image (9) is observed by reflective light (10). The thickness of the suspension layer (5) can be anywhere from a few micrometres (μm) to several tens of micrometres (μm) and the display is usually operated by a D.C. voltage.

In practice the transparent insulating substrates (3a,3b) within the cell may consist of two glass plates separated by a spacing of around 50 μm and sealed around the edges. The electrodes (4a,4b) on the inside of the glass plates may be formed by means of transparent indium tin oxide (ITO) layers.

If the electrophoretic particles (6) are micrometre-sized and have a density comparable to the density of the liquid suspension medium (7), they will remain in suspension for extended periods of time without settling out. In the above display application, the liquid suspension medium (7) may be dyed some dark colour, e.g. black. Typically, the electrophoretic particles (6) will be a contrasting colour to the that of the liquid suspension medium (7). For example, titanium dioxide may be used for the electrophoretic material due to its high scattering power, giving good reflectance.

In the unenergised state, the cell appears black, i.e., the colour of the liquid suspension medium (7). When an electric potential (8) is applied to the opposing electrodes (4a,4b), the electrophoretic particles (6) migrate to one substrate wall (3a,3b) and cause the external appearance of that substrate wall (3a,3b) to change to white. If the electric potential (8) is now removed, the particles continue to stay on the substrate wall (3a,3b) due to Van der Waals attraction and electrostatic forces. A reversal of the polarity of applied electric potential (8) causes the electrophoretic particles (6) to leave the substrate wall (3a,3b) and travel to the opposite substrate wall.

Figure 2:
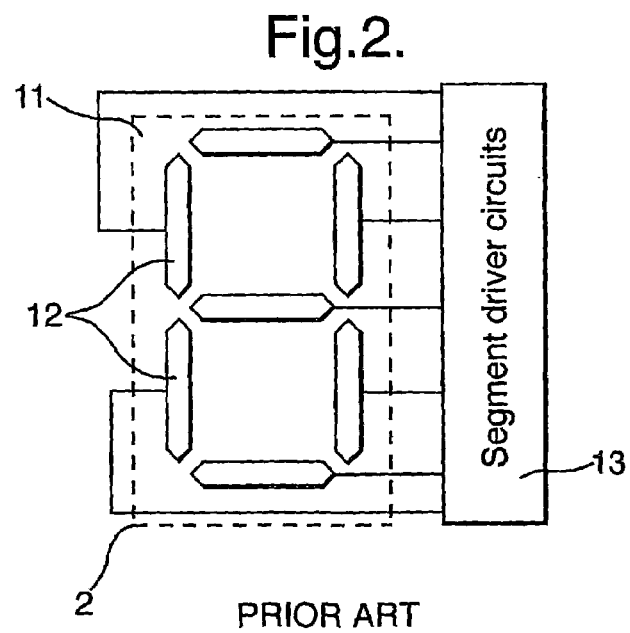

Referring to FIG. 2, if the electrode (4a,4b) on one substrate wall (3a,3b) is in the shape of a character (11), then that character (11) can be made to appear alternately with the above sequence of electric potentials (8) applied. Simple displays having several alpha-numeric characters (11) per display have been fabricated for laboratory demonstrations. In each case every segment (12) of every character (11) is driven individually by a separate driver circuit (13) or driver circuits.

The normal electro-optical behaviour of such a display (1) normally does not make possible, matrix multiplexing of cells. This is caused by a characteristic of the electrophoretic cell (2) whereby the change of optical state is dependent on the product of time and voltage. That is, nearly any small voltage across a cell will cause it to eventually change its optical state.

The device can however be designed with a significant Van der Waals force adhering the particles to the substrates and/or each other to provide some threshold behaviour. This adhesive force is then very sensitive to contamination and typically the suspension of the particles eventually fails leading to flocculation of the particles and overall device failure.

Figure 3:
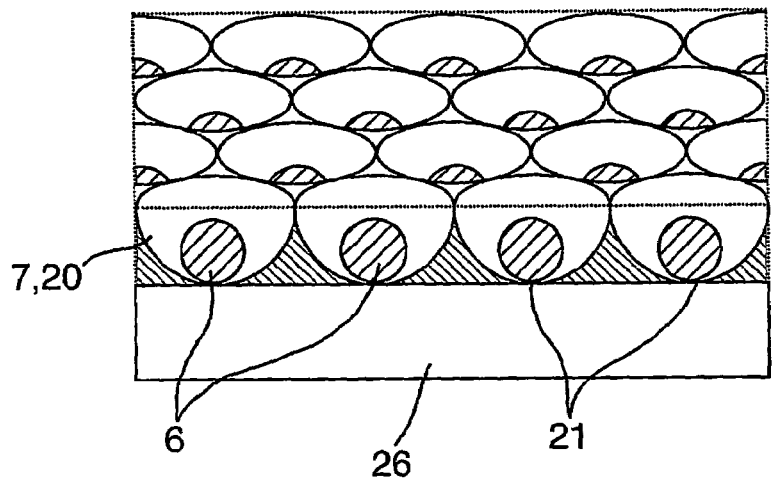

Referring to FIG. 3, an embodiment of an electrophoretic display according to the present invention comprises an electrophoretic system in which particles of an electrophoretic material (6) are suspended in a suspension medium (7) comprising a liquid crystal material (20) and where the geometry of the system is arranged to promote defects (21) within the liquid crystal material (20). A defect (21) may be thought of as a local break in the orientational symmetry of the liquid crystal material (20), for example a local break in the orientational order of the liquid crystal director. Such defects (21) are sometimes referred to as disclinations in the liquid crystal material (20).

The defects (21) within the liquid crystal material (20) are configured to attract electrophoretic particles; each defect (21) giving rise to an associated region of influence within the liquid crystal material (20).

In this configuration, the presence of the particles of electrophoretic material (6) distorts the alignment of the liquid crystal material (20) in the vicinity of the particles (6) and hence the particles (6) act as mobile defects (21), or collections of defects, within the system. When the particles of electrophoretic material are in the bulk of the suspension medium (7) they are relatively free to move under the influence of an applied electric potential. However, when a particle is within the region of influence of a defect (21) in the liquid crystal material (20), an interaction occurs between the defect (21) and the electrophoretic particle (6) whereby the particle (6) is attracted towards the defect associated with that region of influence. If unobstructed, the electrophoretic particle (6) will move within the region of influence to adopt a preferred position where the elastic energy within the system due to the defect (21) is minimised.

The total liquid crystal defect energy within the system is minimised when the particle (6) and the defect (21) are as close as possible and in some cases superposed, in which case the defects or disclinations effectively annihilate. When the defects (21) interact or annihilate, the particle (6) will tend to adhere to the point in the display where the defect (21) originally occurs or occurred (hereinafter referred to as the defect core).

In the absence of an applied electric potential, the particle of electrophoretic material (6) will tend to remain at a preferred position associated with the defect core. This is because the energy of the material is lower in this configuration (with the particle (6) close to or on top of the defect core) than when the particle (6) is in the bulk liquid crystal material (20). This provides the advantage that the long term permanence of the image displayed by the device is improved over a conventional electrophoretic display where the electrophoretic material merely adheres to the surfaces of the display due to van der Waals attraction and electrostatic forces. Flocculation of the electrophoretic particles is also reduced, thereby improving the longevity of the device.

In order to move the particle of electrophoretic material (6) from the preferred position associated with the defect core, an electric potential must be applied to the display which is sufficient to overcome the potential energy barrier associated with separating the defects (21), i.e. in the case where the defects have been annihilated the applied electric potential must be capable of reforming a defect (21) at the defect core and at the particle of electrophoretic material (6).

As discussed above, defects interact with each other in order to reduce the elastic energy of the liquid crystal. Accordingly the defects associated with a particle (6) are influenced by the defects associated with the preferred positions in the liquid crystal cell. Typically, in any particular region of the liquid crystal cell one particular defect will dominate. In this way the elastic energy of the system is reduced by moving the particle (6) towards a defect with opposite strength to the defect(s) associated with the particle (6). Conversely work must be done by an applied electric potential to separate the particle (6) from a defect to which it is attracted. Theoretically, with sufficient work done by the applied electric potential, the particle (6) may be moved to a region of the liquid crystal cell where there is negligible influence on the particle from the defect associated with the preferred position in the liquid crystal cell. If the magnitude of the applied field is insufficient, or if the field is only applied for a short time such that the particle remains within a particular region of influence, then the particle will relax back to its initial position. This threshold behaviour imparts non-linear electro-optic properties to the display and is what makes passive matrix addressing of the device possible.

Figure 4:
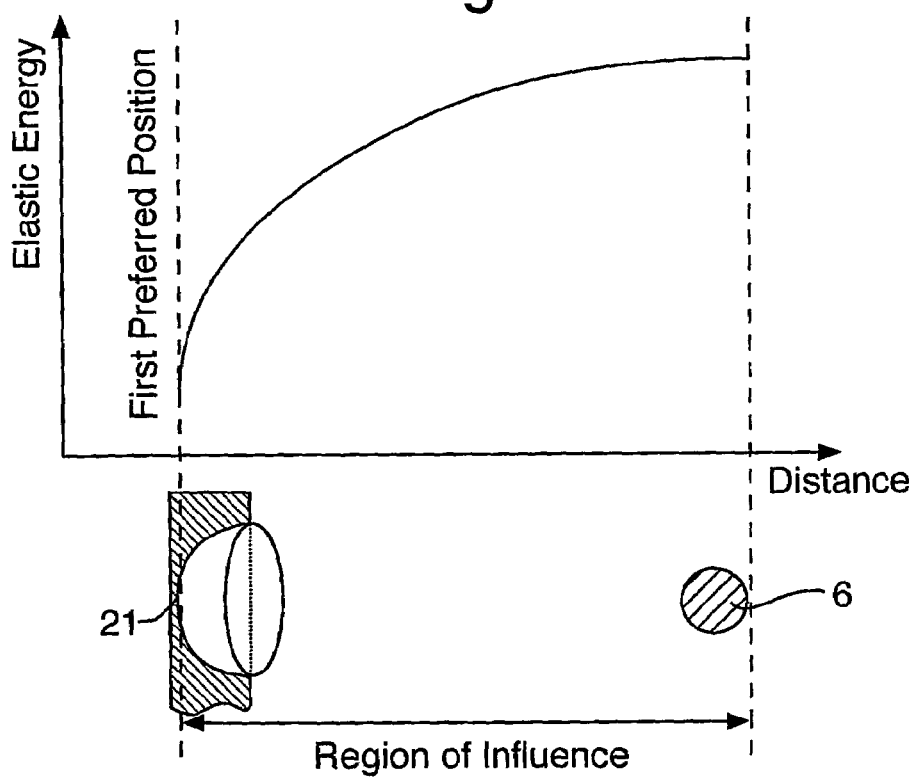
FIG. 4 shows a graph of the elastic energy within an electrophoretic cell according to the present invention as a function of distance from a defect therein. In this example, the electrophoretic cell comprises a single defect and a single phoretic particle.

FIG. 4 shows a graph of the elastic energy within an electrophoretic cell according to the present invention as a function of distance from a defect therein. The graph in FIG. 4 represents an electrophoretic cell comprising a single defect and having a single phoretic particle. In this case, there is a single region of influence which extends within the cell from the defect (21) therein. In practice, the region of influence may extend beyond 50 μm from the defect (21).

A particle of electrophoretic material (6) will experience a force when within the region of influence of the defect (21). If the defect associated with the particle has an opposite sign to that at the defect core then the force will attract the particle (6) to the defect core (21). If unobstructed, the electrophoretic particle (6) will move within the region of influence to adopt a preferred position where the elastic energy within the system due to the defect (21) is minimised (first preferred position).

With regard to an electrophoretic cell as represented in FIG. 4, a monostable configuration can be achieved by restricting the furthest distance the particle (6) can move from the defect core (21). Constraining the motion of the particle (6) within the region of influence in this manner ensures that the particle (6) returns to the first preferred position in the absence of an applied electric potential.

In the interests of clarity, it should be noted that the present invention does not alter the apparent viscosity of the liquid crystal material (20) within the suspension medium (7) to any appreciable extent to provide a non-linear electro-optic behaviour (contrast with U.S. Pat. No. 4,305,807 discussed earlier). Indeed, in the present invention the liquid crystal director is aligned such that the liquid crystal material (20) in the suspension medium (7) always exhibits its lowest viscosity. Moreover, application of an electric potential to an electrophoretic cell according to the present invention will have negligible effect in terms of changing the alignment of the liquid crystal director. Similarly, the defects (21) or disclinations in the present electrophoretic cell remain unaffected by an applied electric potential since they are a created by the geometry of the system and are therefore effectively pinned within the electrophoretic cell.

Figure 5:
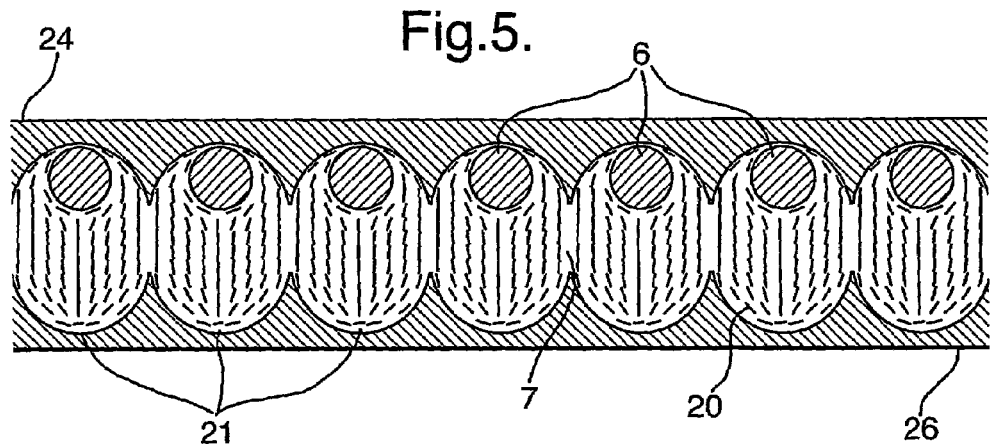
FIG. 5 shows a schematic cross sectional representation of a bistable electrophoretic display according to the present invention. The means for applying the electric potential to the display have been omitted from the figure for clarity.

Referring now to FIG. 5, a bistable display may be created by arranging defects (21) in the liquid crystal material (20) on opposing surfaces within the electrophoretic display. For example, a first set of defects (21) is arranged on the first (front) surface (24) of the display whilst a second set of defects (21) is arranged on the second (rear) surface (26) of the display. In this embodiment, the particles of electrophoretic material (6) may be encouraged to migrate from the first surface (24) to the second surface (26) of the display (and vice versa) by the application of an electric potential which exceeds the threshold level.

In common with FIG. 3, work must be done by the applied electric potential to separate the particle (6) from a defect to which it is attracted. With sufficient work done by the applied electric potential then the particle (6) may be moved to a region of the liquid crystal cell where another defect is dominant. The particle (6) will then relax to a new position in the cell being the preferred position associated with this new defect. Once the region of greatest influence of this second defect is reached it is no longer required that an electric potential is applied to the cell. In this way a threshold in the applied electric potential is required to move the particle (6) far enough away from its initial position so that it relaxes to the a new position in the cell. As before, if insufficient field is applied then the particle (6) will relax back to its initial position.

Figure 6:
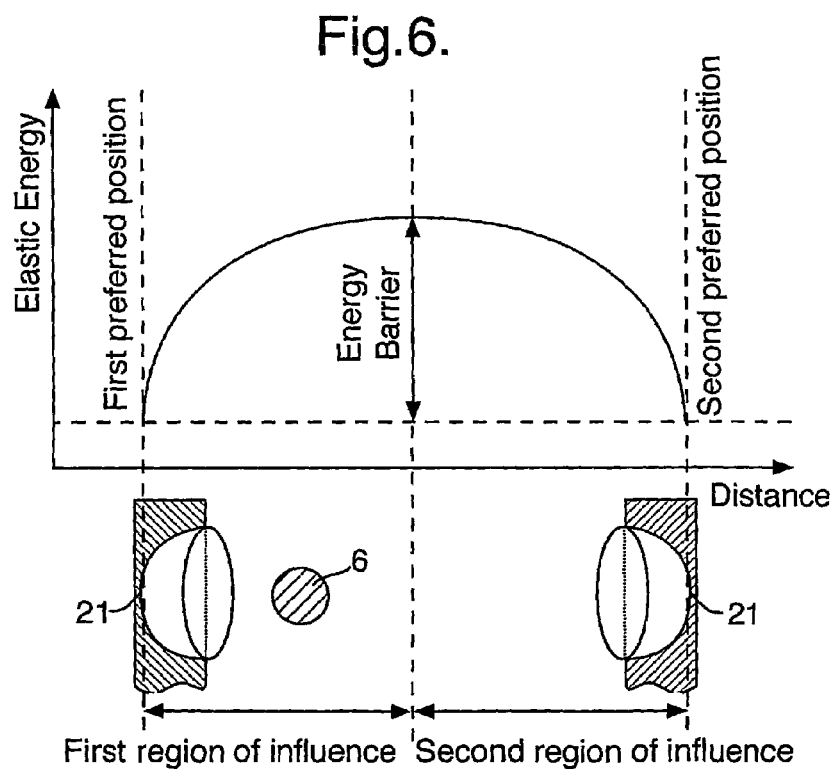

FIG. 6 shows a graph of the elastic energy within a bistable or multistable electrophoretic cell according to the present invention as a function of distance between two opposing defects.

The graph in FIG. 6 represents an electrophoretic cell comprising two opposing defects (21) and having a single phoretic particle (6) arranged there-between. In this case, there is a first region of influence which extends within the cell from the first defect core (21) and a second region of influence which extends within the cell from the second defect core (21).

As described previously, a particle of electrophoretic material (6) will experience a force when within a particular region of influence associated with a defect (21). If the defect associated with the particle (6) has an opposite sign to that at the defect core (21) then the force will attract the particle (6) to the defect core (21). If unobstructed, the electrophoretic particle (6) will move within the region of influence to adopt a preferred position where the elastic energy within the system due to the defect (21) is minimised (in this case the first or second preferred positions).

Typically, in any particular region of the liquid crystal cell one particular defect will dominate. Hence, when the particle (6) is within the first region of influence it will be attracted towards the first defect core (21). Similarly, when the particle (6) is within the second region of influence it will be attracted towards the second defect core (21).

The total elastic energy of the system is found to be highest with the particle (6) at the balance point of the two defects and reduces when the particle (6) moves toward either of the defects.

In the configuration represented in FIG. 6, it is sufficient to merely move the phoretic particle (6) from the region of influence associated with the first defect core to the region of influence associated with the second defect core in order to affect the transfer of the particle between the preferred positions. As described previously, this is due to the fact that once within a particular region of influence, a phoretic particle is attracted towards the defect giving rise to that region of influence.

The electric potential applied to the cell must exceed the energy barrier within the electrophoretic cell, and must be applied for a time period which is sufficient to transfer the particle (6) from one region of influence to the other.

In this manner, the non linear electro-optic behaviour exhibited by the electrophoretic cell is a function of the magnitude of the electric potential applied to the cell (E) and the time (t) for which the potential is applied. Accordingly, the electrophoretic cell exhibits a static threshold relating to the magnitude of the applied electric potential and a dynamic threshold relating to the time period for which the electric potential is applied multiplied by the magnitude of the applied electric potential (time voltage product).

The dynamic threshold is akin to that experienced in some conventional, non-electrophoretic, liquid crystal devices, for example surface stabilised ferroelectric displays, zenithal bistable devices (ZBD), and Nemoptic BiNeme® bistable liquid crystal displays.

The bistable display provides the advantage that the particles of electrophoretic material (6) remain bound at the defect cores when no potential is applied to the device. Moreover, the particles of electrophoretic material (6) remain substantially bound to the defect cores even in the presence of low level electric potentials (below the threshold level of the device). This is advantageous since such electric potentials are inherent in multiplexed addressing schemes. Image quality and therefore large area addressing capability is therefore ensured by reducing unwanted migration of particles of electrophoretic material (6) within the device.

The defects (21) or disclinations in the liquid crystal material (20) may be introduced by any conventional geometry that promotes such defects. For example, it is known in the art that the liquid crystal director can be encouraged to adopt a preferred alignment (planar or homeotropic) with respect to the internal surfaces of a conventional liquid crystal display and that periodic features may be applied to these internal surfaces to introduce disclinations.

In the embodiments of the electrophoretic display illustrated in FIGS. 3 and 5, the defects (21) in the liquid crystal material (20) are introduced by means of a deep two-dimensional array. Typically, the geometry may comprise an array of indentations, each indentation having a depth d, arranged at a pitch p, within the array. The indentations need to be sufficiently deep to produce defects (21) in the liquid crystal material and to this end the ratio of the depth of the indentation, d, to the pitch, p, will typically be at least ¼. In general, deep indentations encourage the formation of defects in the liquid crystal material.

$$\frac{\text{Depth of indentation }(d)}{\text{Pitch of indentations }(p)} \geq \frac{1}{4} \quad [1]$$

By way of example, the geometry employed in the electrophoretic display may comprise substantially semi-ellipsoidal, semi-spheroidal, semi-spherical, or hemispherical indentations arranged in a two-dimensional array. Where the indentations exhibit a substantially elliptical cross section at the internal surface(s) of the display, the radius shall be taken to be the length of the major semi-axis of the ellipse at that internal surface (the semi-axis representing half the length of the axis). The geometry employed in the display may be provided by any conventional method, for example photolithography, embossing etc.

The internal surfaces of the electrophoretic display may require a surface alignment treatment in order to provide a preferred orientation of the liquid crystal material (20) within the display. In the embodiments of the electrophoretic display illustrated in FIGS. 3 and 5, a planar alignment of the liquid crystal material (20) is utilised. A surface alignment treatment may also be required on the particles of electrophoretic material (6) within the display.

The strength of the defects (21) in the liquid crystal material (20) and the corresponding magnitude of the potential energy barrier depends on the profile of the geometry used to promote the defects (21) in the liquid crystal material (20). Accordingly, the potential energy barrier and hence the threshold which must be overcome to move the particles of electrophoretic material (6) from the defect cores may be tailored by varying the profile of the geometry in the display or by varying the natural liquid crystal pretilt or anchoring energy at the surface of the geometry used to promote the defects.

Mindful of the addressing requirements of the display, the threshold which must be overcome to dislodge particles of electrophoretic material (6) from the first surface (24) of the display may be arranged to be different to threshold which must be overcome to dislodge particles of electrophoretic material (6) from the second surface (26) of the display. Consequently, a degree of asymmetry may be incorporated in the electric potential required to move the particles of the electrophoretic material (6) between the first and second surfaces (24,26) of the display, resulting in asymmetric switching thresholds for positive and negative polarity electric potentials. Where the display comprises a plurality of cells or pixels (multi-cellular display), such asymmetry facilitates multiplexed matrix addressing and allows a technique known as line-ahead blanking to be used to address the display. Line-ahead blanking enables the display to be addressed in a single time slot (i.e. the display may be addressed in half the time it would otherwise take if line-ahead blanking were not used).

For an example of standard multiplexing schemes known in the art see "The 'Joers/Alvey' Ferroelectric Multiplexing Scheme", PWH Surguy et al.; Ferroelectrics, Volume 122, pp 63–79, 1991.

A method according the present invention for fabricating an electrophoretic cell as described in the foregoing specific embodiments comprises the following steps:

A substrate having an electrode pattern thereon is prepared. Photoresist is spun onto the surface of the substrate to give a conformal layer, for example Shipley Megaposit SPR220-7 is applied to the substrate and the substrate spun at 2000 rpm for 30 sec.

The photoresist is then processed according to manufacturers instructions. Typically, the substrate is heated to drive off the solvent from the resist.

A two-dimensional array of indentations is then formed in the photoresist using conventional photolithograhic techniques. As described previously, the indentations may be substantially semi-ellipsoidal, semi-spheroidal, semi-spherical, or hemispherical indentations. Typically, a mask and UV light source are used to pattern the photoresist; for example a High Energy Beam Sensitive (HEBS) grey scale photomask (Canyon Materials Inc.) may be used to preferentially expose portions of the photoresist. The photoresist is subsequently developed and the unwanted portions of resist removed, for example by washing the processed substrate. This then gives the surface relief shape shown in FIGS. 3 and 5.

The substrate is processed to cross link the photoresist, thereby improving its resistance to solvents. Optionally, the photoresist is exposed to deep UV radiation then hard-baked at 120° C. for two hours to harden the photoresist.

Finally, the prepared substrate is either assembled directly into an electrophoretic cell or is replicated using moulding and embossing processes (in the latter case the electrode pattern may be omitted from the substrate).

For example, the prepared substrate may be assembled into an electrophoretic cell incorporating a liquid crystal suspension medium and a plurality of electrophoretic particles. The electrophoretic particles are typically deposited onto one of the cell substrates as part of the assembly process prior to adding the liquid crystal suspension medium to the cell.

The liquid crystal suspension medium is incorporated into the assembled electrophoretic cell using a capillary process. Alternatively, a conventional vacuum filling process is used, thereby precluding air entrapment within the electrophoretic cell. The liquid crystal is added to the cell slowly in order to minimise disruption of the electrophoretic particles within the cell.

The liquid crystal material is typically added to the cell in the isotropic phase and then cooled rapidly to room temperature. The well know Schlieren texture forms, however the surface relief with in the cell encourages the majority of the defects form near the bases of the indentations. Subsequent switching of the device reinforces the correct liquid crystal alignment within the cell.

The electrophoretic cell may comprise a single substrate having a relief structure thereon. Alternatively, two prepared substrates may be assembled into an electrophoretic cell and arranged such that each indentation in the relief structure surface on the first substrate is substantially opposite a corresponding indentation in the relief structure surface on the second substrate, said indentations forming a pair of indentations. Typically, a phoretic particle is arranged within each opposing pair of indentations.

Where the prepared substrate is not used directly, a mould may be used to replicate the array of indentations; for example a polydimethylsiloxane (PDMS) mould may be used.

A polydimethylsiloxane (PDMS) elastomer system is chosen such as Dow Corning Sylgard 182. This is a two bottle system and it is prepared by mixing the two components.

The prepared substrate having the array of indentations thereon is used as a master and is covered with the PDMS preparation. The substrate is placed in a vacuum chamber and the air evacuated to remove trapped air bubbles. The system is left until the PDMS has cured. Optionally, the substrate is heated to speed up the curing process.

Once cured, the PDMS mould is removed from the master and washed. Typically, a number of PDMS copies can be made from the master in this manner. The PDMS mould is subsequently used to replicate the original two-dimensional array of indentations via a further moulding process or an embossing process.

A wide range of materials can be used for the final moulding process. One such material is Norland 81, a UV curable glue.

A suitable substrate is chosen and coated in a thin layer of the material to be moulded. Typically, the substrate is coated with a 5 µm thick layer of the material to be moulded.

The coated substrate is then placed in a vacuum chamber with the PDMS mould and the system evacuated, thereby bringing the PDMS mould into contact with the thin layer.

Optionally the mould and substrate can then be removed from the vacuum. The mouldable material is then cured; in the case of Norland 81 the material is exposed to UV light to cure it. Finally the PDMS mould is removed from the substrate.

A thermally curable mouldable material may be used as an alternative to a UV curable material. Thermal curing will necessitate heating the substrate and the moulded material.

In a further embodiment, the mouldable material may comprise a thermoplastic material. In this case, the thermoplastic material is heated in the vacuum chamber before the mould is brought into contact with it. The mould is brought into contact with the thermoplastic material, after which it can be allowed to cool. The mould is removed from substrate once the thermoplastic material has cooled.

It should be noted that moulds can also be made from materials other than PDMS using techniques that are well known, for example Nickel may be used for the mould.

Referring to FIG. 7, a further embodiment of an electrophoretic display according to the present invention comprises a micro-encapsulated electrophoretic system. The micro-encapsulated electrophoretic system typically comprises an array of droplets (30) containing liquid crystal material (20). Each droplet (30) encloses a particle of electrophoretic material (6).

As with the foregoing embodiments, the particles of an electrophoretic material (6) are suspended in a suspension medium (7) comprising a liquid crystal material (20). However, in this embodiment, the suspension medium (7) comprises a plurality of discrete droplets (30) of liquid crystal material (20) arranged within an encapsulant (35), each droplet (30) having an electrophoretic particle disposed therein (6).

For example, the encapsulant (35) may comprise any suitable binder and the micro-encapsulated electrophoretic display is formed by dispersing droplets (30) of liquid crystal material into the binder.

In a specific example, the micro-encapsulated electrophoretic system may comprise a polymer dispersed liquid crystal (PDLC) display having droplets (30) of liquid crystal material (20) dispersed within a polymer matrix.

Referring to FIG. 7, the position of the electrophoretic particle (6) within the droplet (30) of liquid crystal material (20) is controlled by careful selection of the liquid crystal anchoring conditions at the interface between the liquid crystal (20) and the internal droplet (30) surface, and the interface between the liquid crystal (20) and the surface of the electrophoretic particle (6). With essentially non homeotropic anchoring conditions on both the internal surface of the droplet (30) and the surface of the electrophoretic particle (6), the topology shown forces the creation of defects at these surfaces.

A surface alignment treatment may be used to create favourable anchoring conditions (and hence a favourable alignment of the liquid crystal director) within each droplet (30). A suitable surface treatment is one in which a tangential component of the liquid crystal director is encouraged, providing a tilted or planar alignment.

The surface alignment treatment encourages the formation of a first (31) and a second (32) defect within the droplet. The positioning of the defects (31,32) within each droplet (30) is governed by the droplet geometry. Accordingly, the geometry of the droplet (30) may be customised to control the position of the defects (31,32) within the droplet and to ensure that the defects (31,32) are arranged substantially in opposition within the droplet. For example, the droplet (30) may be arranged to be a sphere or a spheroid (rather than perfectly spherical). In particular, the droplet (30) may be customised to exhibit a prolate spheroid configuration with the defects (31,32) arranged substantially in opposition along the major (long) axis of the prolate droplet (30).

The creation of two defects (31,32) within each droplet (30) provides two possible positions for the particle of electrophoretic material (6) to adopt and hence facilitates a display with image memory.

A surface alignment treatment may be applied to the particle of electrophoretic material (6) suspended within each droplet (30). The surface treatment applied to the particle of electrophoretic material (6) should encourage a tangential component of the liquid crystal director, again providing a tilted or planar alignment on the surface of the particle (6). The surface alignment treatment is used to promote two opposing defects (33, 34) on the surface of the particle of electrophoretic material (6).

As shown in FIG. 7, when the electrophoretic particle (6) is disposed within the bulk of the liquid crystal material (20) i.e. away from the defects (31,32) within the droplet (30), then the system will exhibit a certain liquid crystal defect energy due to the defects (31,32) within the droplet (30) and the defects (33,34) on the surface of the particle (6). The total defect energy within the system is a function of the strength and location of the defects (31,32,33,34) within in the system.

The particle of electrophoretic material (6) may be encouraged to migrate within the droplet (30) by the application of an electric potential to the droplet (30).

When a defect (33,34) on the surface of the particle (6) is in the vicinity of a defect (31,32) within the droplet (30), an interaction occurs between the defects. When the particle (6) is in the vicinity of a defect (31,32) within the droplet (30), the total liquid crystal defect energy within the system is lower than when the electrophoretic particle (6) is disposed within the bulk of the liquid crystal material (20) i.e. away from the defects (31,32) within the droplet (30). Indeed, this reduction in the total liquid crystal defect energy within the system is the mechanism by which the defects (33, 34) on the surface of the particle (6) tend to be attracted to the defects (31,32) within the droplet when brought near to each other.

Hence, the total liquid crystal defect energy within the system is minimised when the defect (33,34) on the surface of the particle (6) and the defect within the droplet (31,32) are superposed. In this case, if the geometry of the droplet (30) and the particle (6) allow, then the volume occupied by the defects shall be zero. If the geometry of the droplet (30) and the particle (6) cooperate to a lesser extent then the defects shall occupy a small but finite volume within the droplet. In both of the aforementioned arrangements the total liquid crystal defect energy is minimised and the defects effectively annihilate. This encourages the particle of electrophoretic material (6) to adhere to the internal surface of the droplet (30) and work has to be done to move the particle (6) from this point.

The total elastic energy of the system is found to be highest with the particle (6) at the balance point of the droplet (30) and reduces when the particle (6) moves to either end of the droplet (30).

The operation of the display is illustrated in FIGS. 8a to 8d.

Referring specifically to FIG. 8a, in the absence of an applied electric potential, the system adopts a stable state and the particle of electrophoretic material (6) remains at one end, say the top of the droplet (30). When viewed from above, the particle of electrophoretic material (6) obscures the underlying suspension medium (7) and hence the droplet appears to be substantially the colour of the particle of electrophoretic material (6).

Referring specifically to FIG. 8b, application of an electric potential (40) of sufficient magnitude with the correct polarity dislodges the particle of electrophoretic material (6) from the top of the droplet, simultaneously creating two defects, one defect (31) at the position where the particle originated and a second defect (33) on the surface of the particle of electrophoretic material (6). The particle (6) moves towards the bottom of the droplet (30) under the influence of the applied electric potential (40). Once the particle of electrophoretic material (6) reaches the bottom of the droplet (30) the defect on the surface of the particle (34) and the defect (32) at the bottom of the droplet (30) become superposed. The total liquid crystal defect energy within the system is now lower than when the electrophoretic particle (6) is disposed within the bulk of the liquid crystal material (20) i.e. away from the defects (31,32) within the droplet (30). The superposed defects effectively annihilate. The particle (6) is retained at the bottom of the droplet (30), even when the electric potential (40) is removed. When viewed from above, the suspension medium (7) obscures the particle of electrophoretic material (6) and hence the droplet appears to be substantially the colour of the suspension medium (7).

Referring specifically to FIG. 8c, application of a reverse electric potential of low magnitude (41) is insufficient to pull the particle (6) away from the defect (32) and therefore the particle (6) is not removed from the region of influence of the defect (32). Accordingly, the particle of electrophoretic material (6) relaxes back to its position at the bottom of the droplet (30) after the field is removed.

Referring specifically to FIG. 8d, application of a reverse electric potential of larger magnitude (42) dislodges the particle of electrophoretic material (6), simultaneously creating a defect (34) on the surface of the particle (6) and a defect (32) at the bottom of the droplet (30) and pulls its out of the region of influence of the defect (32). The particle (6) is returned to its original position at the top of the droplet (30) under the influence of the applied- electric potential (42). Once the particle (6) reaches the top of the droplet (30) the two defects (31, 33) superpose. The total liquid crystal defect energy within the system is once again lower than when the electrophoretic particle (6) is disposed within the bulk of the liquid crystal material (20) i.e. away from the defects (31,32) within the droplet (30). The superposed defects effectively annihilate and the particle (6) is retained in that position.

In the embodiments illustrated in FIGS. 7 and 8, the application of a surface alignment treatment to the particle of electrophoretic material (6) ensures that defects (33, 34) are created in the liquid crystal material on the surface of the particle (6) irrespective of the size of the particle (6). Hence, the particle of electrophoretic material (6) may be arranged to be an optimum size so as to maximise optical scattering and provide a high contrast display.

In practice, the particle of electrophoretic material (6) is chosen to be sufficiently large so as to provide a high degree of optical scattering when located at the top of the droplet (30). Further, the particle (6) should be sufficiently large so as to substantially hide the underlying suspension medium when located at the top of the droplet (30); FIGS. 8a and 8d refer. However, when the particle of electrophoretic material (6) is located at the bottom of the droplet (FIGS. 8b and 8c refer), the suspension medium (7) must be capable of obscuring the electrophoretic particle (6), and this may influence the size of the particle of electrophoretic material (6) chosen for the display.

In general, the radius of the electrophoretic particle (6) may be arranged to be at least 30% of the radius of the droplet (30) in order to provide reasonable hiding of the suspension medium (7). Typically, the electrophoretic particle (6) will exhibit a radius of about 50% of that of the droplet (30). Where the droplet (30) is a spheroid, the radius shall be measured perpendicular to the axis along which the defects (31,32) are arranged. For example, where the droplet (30) is a prolate spheroid and the defects (31,32) are arranged substantially in opposition along the major (long) axis of the prolate droplet (30), then the radius of the droplet (30) shall be measured across the minor (short) axis of the droplet (30).

The dimensions of the particles of electrophoretic material (6) may have an effect on the energy barrier associated with forming the defects in the liquid crystal (20) within a display. Hence, the size of the electrophoretic particles (6) may influence the potential energy barrier and consequently the electric potential threshold within the display. Mindful of the foregoing, the particle size may be selected with a view to tailoring the electric potential threshold within the display.

In practice, the radii of the particles of electrophoretic material (6) may lie within a naturally occurring distribution and this enables a micro-encapsulated display device according to the present invention to display a range of gray levels (gray scale). For example, each pixel in the display may comprise a plurality of droplets (30). From the foregoing, the distribution of the radii of the particles (6) within the droplets (30) will give rise to a corresponding distribution in the electric potential thresholds associated with the droplets (30). Hence, the magnitude of the electric potential applied to each pixel in the display will govern the number of droplets (30) which change optical state within that pixel. In this example, the reflectivity of each pixel is related to the number of droplets within the pixel and the optical state of each pixel. Accordingly, the reflectivity of a pixel will be proportional to the magnitude of the electric potential applied to the pixel (governing the number of droplets which change optical state therein), thereby allowing each pixel to display a range of gray levels.

Although the embodiments of the present invention illustrated in FIGS. 7 and 8 provide a display with image memory having non-linear electro-optic behaviour, it may be useful for addressing purposes to incorporate a degree of asymmetry in the electric potential required to move the particles of the electrophoretic material (6) within the droplets (30), resulting in asymmetric switching thresholds for positive and negative polarity electric potentials. As discussed previously, such asymmetry facilitates multiplexed matrix addressing of multi-cellular displays and allows a technique known as line-ahead blanking to be used to address the display.

For clarity, the foregoing descriptions of the embodiments of the present invention have omitted references to particular materials used in the display.

Many of the liquid crystal materials and associated dyes used in conventional liquid crystal displays will operate successfully in the embodiments of the present invention described herein. Any of a wide range of oil soluble dyes may also be used.

The range of suitable liquid crystal materials includes Nematic liquid crystals, for example any of the Merck® liquid crystal mixtures listed in Table 1.0 may be used in the present invention.

TABLE 1.0

| Merck ® Mixture Code |
| --- |
| ZLI-4792 |
| ZLI-5080 |
| ZLI-5091 |
| MLC-6043-000 |
| MLC-6043-100 |
| MLC-6219-000 |
| MLC-6219-100 |
| MLC-6222 |
| MLC-6241-000 |
| MLC-6241-100 |
| MLC-6252 |
| MLC-6256 |
| MLC-6292-000 |
| MLC-6292-100 |
| MLC-6625 |
| MLC-6628 |
| MLC-6694-000 |
| MLC-6694-100 |
| MLC-6846-000 |
| MLC-6846-100 |
| MLC-6847-000 |
| MLC-6847-100 |
| MLC-6848-000 |
| MLC-6848-100 |
| MLC-6849-000 |
| MLC-6849-100 |
| MLC-6873-000 |
| MLC-6873-100 |
| MLC-6874-000 |
| MLC-6874-100 |
| MLC-6875-000 |
| MLC-6875-100 |
| MLC-6876-000 |
| MLC-6876-100 |
| MLC-6893-000 |
| MLC-6893-100 |
| MLC-7700-000 |
| MLC-7700-100 |
| MLC-7800-000 |
| MLC-7800-100 |
| MLC-9000-000 |
| MLC-9000-100 |
| MLC-9100-000 |
| MLC-9100-100 |
| MLC-9200-000 |
| MLC-9200-100 |
| MLC-9300-000 |
| MLC-9300-100 |
| MLC-9400-000 |
| MLC-9400-100 |
| MLC-12000-000 |
| MLC-12000-100 |
| MLC-12100-000 |
| MLC-12100-100 |
| MLC-13200-000 |
| MLC-13200-100 |
| MLC-13300-000 |
| MLC-13300-100 |
| MLC-13800-000 |
| MLC-13800-100 |
| MLC-13900-000 |
| MLC-13900-100 |
| MLC-6601 |
| MLC-6614 |
| MLC-6686 |
| MLC-6692 |
| MLC-15900-000 |
| MLC-15900-100 |
| MLC-16000-000 |
| MLC-16000-100 |

The liquid crystal material may be selected according to the performance characteristics required of the display. For example, the switching speed of the display will be related to the viscosity of the suspension medium (7) and hence a low viscosity liquid crystal material may be preferred for applications requiring fast switching speeds.

The dyes incorporated in the suspension medium (7) may include any conventional dye suitable for use in a guest-host display system and which is compatible with the liquid crystal material (20) used in the display [see "Dyes in Liquid Crystals", Molecular Crystals & Liquid Crystals, Vol. 150A, A. V. lvashchenko, V. G. Rumyantsev].

Appropriate dyes include azo dyes and anthraquinone dyes. Oil soluble food, pharmaceutical and cosmetic dyes are also applicable.

Similarly, many of the materials used in conventional electrophoretic displays will operate successfully in the embodiments of the present invention described herein.

For example, titanium dioxide, $TiO_2$, is commonly used for the particles of electrophoretic material in conventional electrophoretic displays and may be used as the electrophoretic material (6) in the embodiments of the present invention. One of the reasons why titanium dioxide is commonly used for the particles of electrophoretic material (6) is that it exhibits good optical reflection and scattering properties. Alternatively, other materials may be used for the particles of electrophoretic material (6) depending upon the performance specification of the display, for example coloured materials. In particular, the particles of electrophoretic material may comprise spheres having a reflective surface, for example small polymer spheres having a reflective metallic or dielectric surface coating applied thereto. In the case of a dielectric coating, the coating may comprise a reflective multilayer dielectric stack.

As discussed previously, a surface treatment may be applied to the particles of electrophoretic material (6) to encourage a preferred alignment of the liquid crystal material (20) at the surface of the particles (6) and to control particle charge. Conventional surface treatments known to the skilled person may be applied to the particles of electrophoretic material (6) to achieve specific effects. Typically, the particles of electrophoretic material (6) may have a surface coating of silicon dioxide, $SiO_2$, and an organic coating applied thereto to reduce flocculation and to impart surface alignment properties. By way of a further example, particles having a metallic silver coating may be coated in thiol using known techniques with a suitable terminal group to control charge and alignment. Similarly, particles having oxide layers can be coated in silanes.

Referring to FIG. 9, the particle of electrophoretic material (6) may comprise a composite particle in order to maximise scattering of light and thereby provide good reflectance. In the configuration illustrated in FIG. 9, the particle of electrophoretic material (6) comprises scattering particles (45) arranged within a binder (46). The enhanced reflective properties of this arrangement may be attributed to multiple scattering between adjacent and underlying scattering particles (45) within the composite particle. Accordingly, a high proportion of the light incident on the particle (47) is scattered within the composite particle prior to scattering back out of the particle (48).

The scattering particles (45) may comprise any conventional electrophoretic material, for example titanium dioxide, $TiO_2$. Alternatively, the scattering particles (45) may comprise small polymer spheres incorporating a whitener; suitable whiteners include a gas cavity (for example an air pocket), and crushed diamond. The binder (46) is typically any substantially transparent material having a different refractive index to that of the scattering particles (45). The binder (46) may be a cross-linked polymer, for example polymethylmethacrylate (PMMA).

The composite electrophoretic particles (6) referred to above may be fabricated by dispersing particles of titanium dioxide into a monomer system. Monomer droplets are then formed and made spherical, by the action of surface tension, by emulsification in water having a suitable surfactant mixed therewith. The monomer droplets are subsequently cured. Careful selection of the monomer and surfactant allows control of the liquid crystal anchoring conditions at the surface of the composite electrophoretic particle (6). Typically the surfactant must be thoroughly removed from the particles (6) after curing and prior to any further processing. The final composite electrophoretic particles (6) may be inherently hydrophobic or may be subsequently processed to provide a hydrophobic surface, which is beneficial for subsequent incorporation of the composite particles (6) into the electrophoretic displays described herein.

Alternative to removing the surfactant from the composite electrophoretic particles (6), if a polymer surfactant incorporating hydroxyl functional groups (OH), such as polyvinylalcohol (PVA), is used then the residual layer of polymer that typically cannot be washed from the particle surface may be used as a basis for further coating of the composite electrophoretic particles (6). The OH functional groups can be used to attach any number of different silane compounds to the surface of the polymer particles. The processability of the particles can be altered by suitable choice of the silane. Similarly, the liquid crystal anchoring condition on the particle surface, and the electrophoretic charge on the particle can be adjusted by suitable choice of the silane compound.

The dimensions the particles of electrophoretic material (6) will be related to the materials used in the fabrication of the display and the performance specification of the display. In a conventional electrophoretic display, the particles of electrophoretic material (6) are approximately the same size as the wavelength of light incident on the display in order to achieve maximum optical scattering. I In the case of composite electrophoretic particles, the scattering particles (45) should be approximately the same size as the wavelength of the light incident on the display in order to achieve maximum optical scattering. In addition, the scattering particles (45) should be well dispersed within each composite electrophoretic particle and there should be a large difference between the refractive index of the scattering particles (45) and the refractive index of the binder (46).

For particles that have a reflective coating, the particle size is typically at least ten times larger than the wavelength of the light incident on the display.

In practice the size of the particles of electrophoretic material (6), or in the case of composite electrophoretic particles the size of the scattering particles (45), is not critical to the optical performance of the device as long as sufficient back-scattering is ensured.

Similarly, the dimensions of the droplets (30) within a micro-encapsulated electrophoretic display systems of the present invention will also be related to the materials used in the fabrication of the display and the performance specification of the display.

For the micro-encapsulated electrophoretic display systems of the present invention illustrated in FIGS. 7 and 8, droplets (30) may be 1–30 μm in length, and will typically exhibit a length in the range 5–20 μm. For specific applications, the droplets (30) may be selected to have a length in the range 10–15 μm. Where the droplet (30) is a spheroid, the droplet length shall be measured parallel to the axis along which the defects (31,32) are arranged. For example, where the droplet (30) is a prolate spheroid and the defects (31,32) are arranged substantially in opposition along the major (long) axis of the prolate droplet (30), then the length of the droplet (30) shall be measured along the major (long) axis of the droplet (30).

Similarly, the particles of electrophoretic material (6) suspended within the droplets (30) may have diameters in the range 0.2 to 0.8 times the droplet diameter. Typically, the diameter of the particles of electrophoretic material (6) will be 0.3 to 0.7 times the droplet diameter. For specific applications, the electrophoretic particles (6) will have a diameter in the range 0.4 to 0.6 times that of the droplets (30). Where the droplet (30) is a spheroid, the diameter of the droplet (30) shall be measured perpendicular to the axis along which the defects (31,32) are arranged. For example, where the droplet (30) is a prolate spheroid and the defects (31,32) are arranged substantially in opposition along the major (long) axis of the prolate droplet (30), then the diameter of the droplet (30) shall be taken to be the diameter of the minor (short) axis of the droplet (30).

The embodiments of the display according to the present invention may comprise a suspension medium (7) and particles of electrophoretic material (6) sandwiched between transparent insulating substrates (3a,3b) as is conventional in the prior art (see FIG. 1). The substrates may be rigid or may be flexible, for example polymer film. In the case of a micro-encapsulated electrophoretic system (FIGS. 7 and 8 refer), the encapsulant (35) may provide the mechanical support for the suspension medium and the particles of electrophoretic material (6) suspended therein. In this instance one or both of the substrates (3a,3b) may be omitted.

For example, in a micro-encapsulated electrophoretic display according to the present invention, the encapsulant (35) may be arranged to provide substantially all of the mechanical support for the droplets (30) containing the liquid crystal material (20) and the particles of electrophoretic material (6).

In the embodiments of the present invention described herein, the particles of electrophoretic material (6) are encouraged to migrate within the display by means of an applied electric potential. The means for applying the electric potential may be conventional electrodes (4a,4b) including at least one substantially transparent electrode located on one surface of the device in order that the display may be viewed.

Accordingly, conventional indium tin oxide (ITO) electrodes may be used in the embodiments of the present invention.

Alternatively, conducting polymer electrodes may be used to apply the electric potential to the device. Conducting polymer electrodes are more robust than ITO electrodes and may be preferred in applications where the display is likely to be subject to mechanical bending forces or where a flexible display is envisaged.

In a further embodiment of the present invention, the electric potential may be applied to the display via electrodes external to the device. The electric field strength required to operate the device should typically fall within the range 1–10 Volts per µm. Further, the electric potential may comprise an electrostatic field applied externally to the device via removable electrodes. In this particular configuration the display may operate as a display device for recording a substantially permanent image.

With regard to the embodiments of the present invention illustrated in FIGS. 7 and 8, a micro-encapsulated electrophoretic display may be fabricated using the following processes.

The first step in the fabrication of the micro-encapsulated electrophoretic display is to prepare the particles of electrophoretic material (6) for incorporation into the droplets (30). The micro-encapsulated electrophoretic display may incorporate composite electrophoretic particles (6) as described previously (FIG. 9 refers) and such particles may be prepared as follows.

Referring to FIG. 10a, a suitable grade of titanium dioxide ($TiO_2$) is chosen (50) with particle size to give good light scattering properties arid preferably with a silica coated surface. The titanium dioxide is processed, to impart hydrophobic properties to the particles (6). For example, a conventional silanation process may be used. This is achieved by dispersing (51) 20 g of the titanium dioxide in 400 ml of anhydrous cyclohexane and then adding (52) an alkyltrichlorosilane (in this case 0.2 g of octyltrichlorosilane) to the dispersion. This is emulsified (53) for 4 hours to ensure complete dispersion of the titanium dioxide in the system and complete reaction of the octyltrichlorosilane with the titanium dioxide surface. The titanium dioxide particles are separated (54) from the cyclohexane in a centrifuge and then mixed (55) with fresh cyclohexane. This process is repeated twice (56) and the titanium dioxide dried (57) in an oven at 80° C. for an hour. The titanium dioxide particles are now hydrophobic (58).

The next step in the fabrication of the composite electrophoretic particles (6) is to disperse (60) the light scattering particles (45), titanium dioxide in this case, in a non-water soluble monomer in the presence of a cross-linking agent and an initiator (e.g. a thermal initiator or a photo-initiator). The mixture is emulsified (61) with an aqueous solution of a suitable surfactant to produce monomer droplets having scattering particles dispersed therein. The initiator is activated (62) to promote cross linking of the monomer. Activation may be by heating in the case of a thermal initiator or illumination with electromagnetic radiation in the case of a photo-initiator.

Referring to FIG. 10b, the 20 g of titanium dioxide, which is now hydrophobic, is dispersed (60) into a mixture of 49 g of methylmethacrylate, 29 g of neopentyl glycol dimethacrylate and 2 g of thermal initiator lauryl peroxide. This mixture is emulsified (61) into a 1% solution of polyvinylalcohol, with a molecular weight of 125,000. The vigour of this emulsification step and/or the quantity of the polyvinylalcohol additive can be used to control the particle size. This emulsion is then placed (62) in a preheated oven at 80° C. for 1.5 hours. On removal from the oven the product is centrifuged (63), excess water removed and then the particles are remixed (64) with fresh water. This process is repeated several times.

The composite electrophoretic particles (6) may be further treated to facilitate subsequent processing and to control the alignment the liquid crystal on the particles. The following process (65) allows the addition of a silane to the surface on the composite electrophoretic particles, such as phenyltrichlorosilane, to allow control of the subsequent processing and also of the liquid crystal alignment on the particles. The composite electrophoretic particles are separated from the water and the water is replaced with dry tetrahydrofuran (THF), the rinsing and separation is repeated several times with the THF. The THF is then replaced with dry cyclohexane and rinsing and separation repeated several times. The composite particles (6) are then in a relatively water free environment so the separated particles can then be added to a mixture of the silane in cyclohexane. The composite particles are left in this mixture for about a hour while mixing. The composite particles are then separated from the cyclohexane and silane mixture and rinsed in dry cyclohexane several times as before to remove residual silane. Finally the composite electrophoretic particles are dried (67) in a warm oven to yield a free flowing powder.

The next stage involves the dispersion of the electrophoretic particles (6) into liquid crystal droplets (30) and then encapsulation of the droplets (30) to form a dry free flowing powder comprising individually encapsulated droplets (30). Conventional $TiO_2$ electrophoretic particles (6) or composite electrophoretic particles (6) may be used.

Referring to FIG. 11, a traditional encapsulation technique involves the use of gelatine and gum arabic and involves the vigorous emulsification of liquid crystal into a gelatine solution. Hydrophobic electrophoretic particles (6) are mixed with liquid crystal (20) and the mixture is emulsified (72) in an aqueous gelatine solution. The system is further mixed (73) with gum arabic solution and the encapsulation process continued by slow dilution (76) with water. This causes a layer of coacervate (a colloidal aggregation) to be deposited around the droplets (30). At this stage a gluteraldehyde solution is added (78) to the system to cross link the protein chains and the system is cooled (79) to gel the gelatine while the cross linking process proceeds. These cured capsules (85) containing liquid crystal (20) and electrophoretic particles (6) are then spray dried (80) to produce a dry free flowing powder.

The encapsulation technique may be modified by the inclusion of an alternative coacervation step. Referring to FIG. 12, the liquid crystal (20) and the electrophoretic particles (6) are emulsified (72) in an aqueous gelatine solution. The system is further mixed (73) with gum arabic solution. In this embodiment of the present invention the encapsulation process is continued by increasing the pH of the emulsion (75), diluting with water (76) and reducing the pH of the emulsion (77). This causes a layer of coacervate (a colloidal aggregation) to be deposited around the droplets (30). At this stage a gluteraldehyde solution is added (78) to the system to cross link the protein chains and the system is cooled (79) to gel the gelatine while the cross linking process proceeds. These cured capsules (85) containing liquid crystal (20) and electrophoretic particles (6) are then spray dried (80) to produce a dry free flowing powder.

The technique for encapsulation is based on traditional gelatine and gum arabic encapsulation processes. Specifically, 1 g of a high bloom strength gelatine (isoelectric point pH 8) is dissolved in 25 ml of water at 50° C. At the same time 1 g of gum arabic is dissolved in 50 ml of water at 50° C. and put to one side. At the same time 10 g of the dried particles of titanium dioxide dispersed in the polymethylmethacrylate, as produced previously (FIG. 10 refers), is dispersed thoroughly into 20 g of a selected commercially available liquid crystal (such as any of the Merck® liquid crystal mixtures listed in Table 1.0), into which has been dissolved 2% by weight of an oil soluble (non water soluble) dichroic dye or dyes such as 1-hydroxy-4-[(4-methylphenyl)amino]-9,10-anthracenedione. This mixture of particles (6) and liquid crystal (20) is added slowly into 25 ml of aqueous gelatine solution and mixing is continued. To the resulting emulsion sodium hydroxide solution is added to raise the pH to 12. Then the gum arabic solution is mixed with the emulsion. The emulsion is then transferred to a larger beaker and, as in all previous steps, is held at 50° C. at the same time mixing is continued slowly. 200 ml of water at 50° C. is then added to the system and stirred until mixed thoroughly. At this point a 10% solution of acetic acid is then drop by drop to the emulsion until a pH of 4.7 is reached, this triggers coacervation and formation of a protein layer around the droplets (30). To the emulsion is added 0.35 g of a 50% gluteraldehyde solution to cross link the capsule walls and the temperature is then reduced to 10° C. over half an hour. The pH of the emulsion is then increased to 11. The emulsion is then left to mix for at least 12 hours and the temperature of the system then raised to room temperature. The resulting hardened capsules (85) are dried using standard techniques yielding a free flowing powder.

The foregoing technique describes a gelatine and gum arabic encapsulation technique for the droplets (30) of liquid crystal material (20). A selection of suitable encapsulation techniques are further described in the documents cited in Table 2.0.

TABLE 2.0

| Reference | Description |
| --- | --- |
| U.S. Pat. No. 2,800,457 | Green BK and Schleicher L; July 1957; Adapted for use in the embodiments described herein. |
| U.S. Pat. No. 3,041,288 | Anthony WH; June 1962; High molecular weight fractionated gelatine-gum arabic coacervation by pH adjustment, can give stronger capsules with less capsule loss by clumping together. |
| ISBN 0815504497 | "Capsule Technology and Microencapsulation 1972" M Gutcho, Noyes Data Corporation, New Jersey, USA, 1972, ISBN 0815504497 |

However, any suitable encapsulation technique may be employed to fabricate the micro-encapsulated electrophoretic display of the present invention.

The final step in the fabrication of the micro-encapsulated electrophoretic display is to incorporate the hardened capsules (85) into a bulk encapsulant (35) to form a display device.

Referring to FIG. 13, the powder of hardened capsules (85) is dispersed (90) into a bulk encapsulant (35) which exhibits a low shrinkage on curing. The encapsulant (35) may comprise a low viscosity and Ultraviolet (UV) or thermally curable binder giving a high density of capsules (85). Note, at this stage the capsules (85) may be spheres or may be spheroids, for example prolate spheroids.

This dispersion is then placed (91) between two substrates which incorporate an electrode pattern. An electric or magnetic field is applied (92) to the system to align the capsules (85) appropriately. For example, where the capsules (85) are prolate spheroids and the liquid crystal (20) inside the capsules (85) is aligned with the long axis of the prolate capsules (85), then the capsules (85) shall be aligned with the long axis perpendicular to the substrates. The bulk encapsulant (35) is cured (93), thereby fixing the aligned capsules in the encapsulant (35).

Specifically, the dispersion is coated onto a substrate upon which is an electrode, such as indium tin oxide on glass. This electrode may be patterned and also may be metal to give a conductive and reflective surface. The coated layer is typically one to two capsules (85) deep where a capsule (85) is typically about 10 μm. Onto this layer is laminated another substrate upon which is a transparent electrode, which may also be patterned such that with the other electrode pattern a matrix array of pixels is generated. The orientations of the capsules (85) are then aligned by the application of an electric field between the substrates. Alternatively, this may be done by a magnetic field. After alignment the encapsulant (35) is cured (93) by exposure to UV radiation.

Alternatively, the steps of aligning (92) the capsules (85) and curing (93) the bulk encapsulant (35) may be transposed. In this embodiment, a thermal curing low shrinkage elastic encapsulant (35) may be used, for example a silicone elastomer system, e.g. Dow Corning® Sylgard® 182. In this case a high expansion coefficient substrate is used. The contraction of the substrate after curing leads to a compression of the encapsulant (35) in the plane of the substrate. This forces the capsules (85) in the encapsulant (35) into a prolate spheroid shape with the long axis perpendicular to the substrate. In turn the liquid crystal (20) inside the capsules, which is in the so called 'boojum' configuration due to nominally planar surface anchoring conditions, aligns with the long axis of the prolate capsules (85). In this embodiment of the present invention the thermal expansion coefficient of the substrate must be chosen to be greater than the thermal expansion coefficient of the encapsulant (35). In use, the encapsulant (35) must remain under compression in the plane of the substrate to ensure that the capsules (85) remain in a prolate spheroid shape.

Another way of achieving the above effect is to use a resilient substrate which can stretched prior to curing the encapsulant (35). In this embodiment of the present invention, the substrate is stretched prior to curing the encapsulant (35). The substrate is then allowed to contract after the encapsulant (35) has been cured. As before, the contraction of the substrate after curing leads to a compression of the encapsulant (35) in the plane of the substrate. This forces the capsules (85) in the encapsulant (35) into a prolate spheroid shape with the long axis perpendicular to the substrate. As before, a silicone elastomer system, e.g. Dow Corning® Sylgard® 182 may be used in this embodiment of the invention. Again, the encapsulant (35) must remain under compression in the plane of the substrate to ensure that the capsules (85) remain in a prolate spheroid shape.

A further technique for configuring the capsules (85) is to modify the properties of the dispersion after the bulk encapsulant has been cured. In this embodiment of the present invention, the dispersion is coated onto a substrate and the bulk encapsulant (35) is cured, thereby immobilising the capsules (85) and bonding with the substrate. Note, at this stage the capsules (85) may be spheres or may be randomly oriented spheroids. It is possible that, during curing, the bulk encapsulant will shrink and this may force the capsules (85) in the encapsulant (35) into a prolate spheroid shape with the long axis parallel to the substrate. However, this non-preferred configuration of the capsules is immaterial at this intermediate processing stage. After curing, a suitable material is introduced into the bulk encapsulant (35), for example by diffusion, to expand the encapsulant (35). Since, during curing, the encapsulant (35) has bonded to the substrate, the encapsulant (35) can only expand in a direction substantially perpendicular to the plane of the substrate. Accordingly, the expansion of the encapsulant (35) forces the capsules (85) into a prolate spheroid shape with the long axis perpendicular to the substrate.

As before, a thermal curing low shrinkage elastic encapsulant (35) may be used, for example a silicone elastomer system, e.g. Dow Corning® Sylgard® 182. In the case of a silicone elastomer, a silicone oil may be diffused into the elastomer to cause the elastomer to expand. In practice, the step of diffusing the silicone oil into the cured silicone elastomer comprises soaking the elastomer in the silicone oil. A low molar mass silicone oil may be used to ensure good diffusion within the cured silicone elastomer.

Referring to FIG. 14, there is shown a cross sectional schematic representation of a portion of a micro-encapsulated electrophoretic display (100) according to one aspect of the present invention. The micro-encapsulated electrophoretic display (100) comprises a plurality of liquid crystal droplets (30), each droplet having an electrophoretic particle (30), disposed therein. The droplets (30) are encapsulated between two substantially parallel substrates (101a, 101b) using an encapsulant (35). In the particular configuration shown in FIG. 14, the droplets (30) exhibit a prolate spheroid configuration with the long axes of the droplets (30) arranged substantially orthogonal to the substrates (100a, 100b). The micro-encapsulated electrophoretic display (100) also comprises a plurality of strip like electrodes (102,103) arranged on the internal surfaces of the substrates (101a, 101b). In use, the electrodes are used to apply electric fields to the droplets (30) within the display (100).

In the embodiment of the present invention shown in FIG. 14, the electrodes (102, 103) are arranged in rows and columns within the display (100). Specifically, the electrodes (102) adjacent the first substrate (101a) are arranged in rows and the electrodes (103) adjacent the second substrate are arranged in columns. Typically, the row electrodes (102) and the column electrodes (103) are arranged to be substantially perpendicular to each other.

This arrangement of the electrodes in rows and columns provides a matrix of addressable picture elements (pixels) within the display (100). Each pixel is formed by the intersection of a row electrode (102) and a column electrode (103). Each pixel comprises at least one liquid crystal droplet (30) having an electrophoretic particle (6) disposed therein. The electrophoretic particle (6) within the droplet (30) is controllable by an electric potential applied between the corresponding row and column electrodes for that pixel. Accordingly, matrix addressing of the pixels with in the display (100) is facilitated. In practice, each pixel may comprise a plurality of such droplets (30), thereby enabling each pixel to display a range of gray levels (gray scale). At least one of the electrodes (102,103) may be transparent in order that the underlying droplet (30)/electrophoretic particle (6) is visible.

It should be noted that the liquid crystal droplets (30) shown in FIG. 14 may comprise capsules (85) dispersed in an encapsulant (35). Moreover, the micro-encapsulated electrophoretic display (100) may be configured such that the layer between the substrates (101a,101b) is typically one or two capsules (85) deep (a single capsule depth is shown in FIG. 14 for clarity).

Notwithstanding the inclusion of electrodes in the aforementioned device, the micro-encapsulated electrophoretic display described above may be operated using an electric potential applied to the display via electrodes external to the device. Further, the electric potential may comprise an electrostatic field applied externally to the device via removable electrodes.

For clarity, it should be noted that in FIG. 14 the electrophoretic cells addressed by the first electrode (103) (those on the left hand side of the display (100)) are shown fully switched whereas the adjacent electrophoretic cells addressed by the second electrode (103) are shown partially switched. In this manner in a range of grey levels are obtainable in the display (100).

With regard to the types of dyes used in the embodiments of the present invention, generally all dyes which are soluble in liquid crystal are useful in the embodiments of the present invention described herein. Further, any suitable combination of dyes may be used to create required colours in the device, for example black.

A selection of dyes suitable for use in the embodiments of the present invention described herein is identified in Table 3.0.

TABLE 3.0

| CI Name | FDA Name | Chemical Name |
|---|---|---|
| Solvent Violet 13 | D&C Violet 2 | 1-hydroxy-4-[(4-methylphenyl)amino]-9,10-anthracenedione |
| Solvent Yellow 33 | D&C Red 17 | 2-(2-quinolyl)-1,3-indandione |
| Solvent Green 3 | D&C Green 6 K7016 | 1,4-bis[(4-methylphenyl)amino]-9,10-anthracenedione |
| Solvent Red 23 | D&C Yellow 11 K7064 | 1-[[4-(phenylazo)phenyl]azo]-2 naphthalenol |

The foregoing embodiments of the phoretic display device according to the present invention have been described predominantly in terms of electrophoretic behaviour. However, as highlighted earlier, magnetophoretic behaviour is equally applicable to the embodiments described herein. Indeed magnetophoretic operation may be employed as a substitute for electrophoretic operation in the previous embodiments. Alternatively, magnetophoretic operation and electrophoretic operation may be used in combination to alter the display state of the devices described herein.

In order to incorporate magnetophoretic behaviour into any of the aforementioned embodiments merely requires use of a phoretic particle having magnetic or ferromagnetic properties. The phoretic particle would then respond to an applied magnetic field in a manner analogous to that described previously for an electric field. For example, in a magnetophoretic display according to the present invention, the display state is switchable by applying a magnetic field of a given field strength to the display. The magnetic field may be provided by a permanent magnet (e.g. in the form of a pen or stylus tipped with a magnet) or could be generated electromagnetically. As before, the phoretic particle would migrate within the device under the influence of the applied field (albeit a magnetic field rather than an electric or electrostatic field as before).

The thresholding effects described previously, arising from the disclinations within the liquid crystal material (20), would operate in a magnetophoretic cell in a manner similar to that described earlier for electrophoretic cells. Accordingly, the advantages discussed herein arising from said thresholding effects would be conferred on a magnetophoretic display in the same way as for an electrophoretic display.

A hybrid display device exhibiting both electrophoretic and magnetophoretic behaviour offers further switching combinations. For example, such a hybrid display could be switched spatially using a localised magnetic field from a pen or stylus tipped with a magnet. However, the display could then be erased by application of an electric potential to the entire display, which would switch the phoretic particles to one state as in a purely electrophoretic display. Moreover, information written on such a display may be recorded by detecting the small current pulse induced by the device switching between display states. This detection may be implemented by incorporating patterned electrodes in the display and erasing the image one line at a time.

The invention claimed is:

1. A phoretic cell comprising a liquid crystal cell having a liquid crystal material and a phoretic particle therein, the phoretic particle being moveable from a first preferred position at a first side of the liquid crystal cell to a second side of the liquid crystal cell on application of a field, the liquid crystal cell being adapted such that, when the phoretic particle is not located at the first preferred position, there is a defect associated with the first preferred position and the liquid crystal defect energy of said defect is lower when the phoretic particle is located substantially at the first preferred position within the liquid crystal cell than when the phoretic particle is not so located.

2. A phoretic cell according to claim 1 wherein the applied field must exceed a threshold level to move the phoretic particle from the first preferred position to the second side of the liquid crystal cell.

3. A phoretic cell according to claim 2 wherein the phoretic particle is moveable reversibly from a second preferred position at the second side of the liquid crystal cell to the first preferred position at the first side of the liquid crystal cell on application of a field, the liquid crystal cell being adapted such that, when the phoretic particle is not located at the second preferred position, there is a defect associated with the second preferred position and the liquid crystal defect energy of said defect is lower when the phoretic particle is located substantially at the second preferred position within the liquid crystal cell than when the phoretic particle is not so located.

4. A phoretic cell according to claim 3 wherein the applied field must exceed a threshold level to move the phoretic particle from the second preferred position to the first preferred position within the liquid crystal cell.

5. A phoretic cell according to claim 4 wherein the magnitude of the threshold level associated with moving the phoretic particle from the first preferred position to the second preferred position within the liquid crystal cell is different to that for moving the phoretic particle from the second preferred position to the first preferred position within the liquid crystal cell.

6. A phoretic cell according to claim 1 having a plurality of first preferred positions at the first side of the liquid crystal cell, each first preferred position having a defect associated therewith, and a plurality of phoretic particles dispersed within the liquid crystal material.

7. A phoretic cell according to claim 3 having a plurality of first preferred positions at the first side of the liquid crystal cell, each first preferred position having a defect associated therewith, and a plurality of second preferred positions at the second side of the liquid crystal cell, each second preferred position having a defect associated therewith, and a plurality of phoretic particles dispersed within the liquid crystal material.

8. A phoretic cell according to claim 6 wherein at least one internal surface of the liquid crystal cell is profiled so as to induce said defects.

9. A phoretic cell according to claim 8 wherein the profile comprises a plurality of indentations arranged in an array.

10. A phoretic cell according to any of claim 3 herein the liquid crystal cell comprises a liquid crystal droplet.

11. A phoretic cell according to claim 10 wherein the phoretic cell comprises a plurality of liquid crystal cells.

12. A phoretic cell according to claim 1 wherein the liquid crystal cell includes a dye.

13. A phoretic cell according to claim 1 wherein the phoretic particle is adapted to reflect electromagnetic radiation incident thereon.

14. A method for fabricating a phoretic cell as claimed in claim 6, having a plurality of phoretic particles suspended within a liquid crystal suspension medium, comprising the steps of (i) preparing a first substrate having a first relief structure alignment layer adapted to interact with the liquid crystal suspension medium to provide a preferred alignment of the liquid crystal director within the phoretic cell, (ii) forming a plurality of indentations within the relief structure alignment layer, each indentation having an internal surface extending from a relief structure surface of the relief structure alignment layer, (iii) depositing the phoretic particles onto the first relief structure surface, (iv) incorporating the liquid crystal suspension medium into the cell.

15. A method for fabricating a phoretic cell according to claim 14 comprising the steps of (v) preparing a second substrate having a second relief structure alignment layer adapted to interact with the liquid crystal suspension medium to provide a preferred alignment of the liquid crystal director within the phoretic cell, (vi) forming a plurality of indentations within the second relief structure alignment layer, each indentation having an internal surface extending from a relief structure surface of the second relief structure alignment layer, (vii) arranging the second substrate remotely to the first substrate such that the relief structure alignment layer thereof interacts with the liquid crystal suspension medium to provide a preferred alignment of the liquid crystal director within the phoretic display.

16. A method according to claim 15 comprising the step of arranging each indentation in the relief structure surface of the first relief structure alignment layer substantially opposite a corresponding indentation in the relief structure surface of the second relief structure alignment layer, said indentations forming an opposing pair of indentations.

17. A method according to claim 16 comprising the step of arranging a phoretic particle within each opposing pair of indentations.

18. A display having a first display surface for displaying an image, comprising a phoretic cell as claimed in claim 1, wherein the phoretic cell is arranged within the display such that the or each first preferred position within the liquid crystal cell is located substantially at the first display surface, the display being operable by the application of a field across the display.

19. A display according to claim 18 having a second display surface disposed remotely to the first display surface, wherein the phoretic cell is arranged within the display such that a second preferred position within the liquid crystal cell is located substantially at the second display surface, and the first and second preferred positions are such that the phoretic particle is visible at a display surface when located at one preferred position and is not visible at said display surface when located at the other preferred position.

20. A display according to claim 19 having a phoretic cell comprising a plurality of liquid crystal cells, each liquid crystal cell comprising a liquid droplet, wherein the liquid crystal droplets are disposed within an encapsulant.

21. A method of fabricating a display as claimed in claim 18 comprising the steps of (i) dispersing a plurality of liquid crystal cells as described in claim 10 into a curable encapsulant, (ii) aligning the liquid crystal cells into a preferred alignment, and (iii) curing the encapsulant to retain the liquid crystal cells therein.

22. A method of fabricating a display according to claim 21 further comprising the step of applying the dispersion of liquid crystal cells and curable encapsulant onto a substrate.

23. A method of fabricating a display according to claim 22 wherein the step of aligning the liquid crystal cells into a preferred alignment is performed after the encapsulant has been cured and comprises the step of expanding the cured encapsulant in a direction substantially perpendicular to the substrate, thereby enlongating the liquid crystal cells dispersed therein in a direction substantially perpendicular to the substrate.

24. A method of fabricating a display according to claim 23 wherein the step of expanding the cured encapsulant comprises introducing a material into the cured encapsulant so as to cause the cured encapsulant to swell.

25. A method of fabricating a display according to claim 22 comprising the intermediate steps of reversibly deforming the substrate in the plane of the substrate prior to curing the encapsulant and subsequently returning the substrate to is undeformed state after curing the encapsulant, so as to perform the step of aligning the liquid crystal cells, such that the cured encapsulant and the liquid crystal cells dispersed therein are compressed in a plane parallel with that of the substrate.

26. A method of fabricating a display according to claim 25 wherein the step of reversibly deforming the substrate comprises at least one of heating and stretching the substrate.

* * * * *

UNITED STATES PATENT AND TRADEMARK OFFICE
CERTIFICATE OF CORRECTION

PATENT NO. : 7,145,626 B2  
APPLICATION NO. : 10/524095  
DATED : December 5, 2006  
INVENTOR(S) : Miller et al.

It is certified that error appears in the above-identified patent and that said Letters Patent is hereby corrected as shown below:

At column 34, line 55, delete "any of".

At column 34, line 55, delete "herein" and replace it with -- wherein --.

At column 36, line 41, delete "is" and replace it with -- its --.

Signed and Sealed this

Sixth Day of March, 2007

JON W. DUDAS  
*Director of the United States Patent and Trademark Office*